(12) United States Patent
Seiler et al.

(10) Patent No.: US 10,385,897 B2
(45) Date of Patent: Aug. 20, 2019

(54) DOWEL ELEMENT, FASTENING DEVICE, METHOD FOR PRODUCING A DOWEL ELEMENT, AND METHOD FOR INSTALLING A FASTENING DEVICE

(71) Applicant: Lamello AG, Bubendorf (CH)

(72) Inventors: Philipp Seiler, Arboldswil (CH); Patrick Jeker, Brislach (CH)

(73) Assignee: Lamello AG, Bubendorf (CH)

( * ) Notice: Subject to any disclaimer, the term of this patent is extended or adjusted under 35 U.S.C. 154(b) by 0 days.

(21) Appl. No.: 15/660,804

(22) Filed: Jul. 26, 2017

(65) Prior Publication Data

US 2017/0321736 A1 Nov. 9, 2017

Related U.S. Application Data

(63) Continuation of application No. PCT/EP2016/052263, filed on Feb. 3, 2016.

(30) Foreign Application Priority Data

Feb. 12, 2015 (DE) .................. 10 2015 202 593

(51) Int. Cl.
*F16B 13/02* (2006.01)
*F16B 13/00* (2006.01)
*F16B 5/00* (2006.01)
*F16B 21/07* (2006.01)

(52) U.S. Cl.
CPC ............ *F16B 13/025* (2013.01); *F16B 13/00* (2013.01); *F16B 5/0024* (2013.01); *F16B 13/02* (2013.01); *F16B 21/075* (2013.01)

(58) Field of Classification Search
CPC ........ F16B 5/0024; F16B 5/125; F16B 13/00; F16B 13/025; F16B 21/075; F16B 21/20; F16B 37/02; F16B 39/17; F16B 13/02
USPC ......... 411/424, 516, 520, 521, 525, 526–528
See application file for complete search history.

(56) References Cited

U.S. PATENT DOCUMENTS

| 2,008,229 A | * | 7/1935 | Sharp ...................... F16B 35/04 411/424 |
| 3,269,251 A | * | 8/1966 | Bass ...................... F16B 37/122 411/21 |
| 3,433,119 A | * | 3/1969 | Ballantyne .............. F16B 21/16 411/437 |
| 3,916,756 A | | 11/1975 | Yoda |

(Continued)

FOREIGN PATENT DOCUMENTS

| CN | 202 381 478 U | 8/2012 |
| CN | 102 384 135 B | 4/2013 |

(Continued)

*Primary Examiner* — Roberta S Delisle
(74) *Attorney, Agent, or Firm* — Aslan Law, P.C.

(57) ABSTRACT

In order to provide an anchor element for fastening an article to a further article, this anchor element being simple and inexpensive to produce and enabling an article to be fastened to a further article simply and reliably, it is proposed that the anchor element should include a base body that takes a hollow form, at least in certain regions, and surrounds a receiving space for receiving a fastening element, wherein the base body includes one or more elastically yielding spring elements that are formed by one or more wall portions of the base body, and these project into the receiving space in an installed condition of the anchor element.

16 Claims, 28 Drawing Sheets

(56) References Cited

U.S. PATENT DOCUMENTS

| | | | |
|---|---|---|---|
| 5,704,752 A | | 1/1998 | Logerot |
| 7,344,346 B2* | | 3/2008 | Hsu .................. F16B 21/02 |
| | | | 411/21 |
| 7,611,303 B2* | | 11/2009 | Hanrahan ............ F16D 1/0835 |
| | | | 403/367 |
| 7,985,042 B1* | | 7/2011 | Paxton ................ F16B 37/0842 |
| | | | 411/437 |
| 8,635,758 B2* | | 1/2014 | Slepecki .............. E04H 13/003 |
| | | | 29/525.02 |
| 2004/0170484 A1* | | 9/2004 | Pourtier ................ F16B 13/02 |
| | | | 411/57.1 |
| 2009/0148254 A1* | | 6/2009 | Carrillo, Sr. ........ F16B 23/0023 |
| | | | 411/404 |
| 2011/0158767 A1* | | 6/2011 | Elkins .................. B21H 7/002 |
| | | | 411/424 |
| 2015/0107060 A1 | | 4/2015 | Ortega Dona et al. |

FOREIGN PATENT DOCUMENTS

| | | |
|---|---|---|
| CN | 104220302 A | 12/2014 |
| DE | 26 05 732 A1 | 8/1977 |
| DE | 32 12 160 A1 | 10/1983 |
| DE | 32 16 880 C2 | 11/1985 |
| DE | 199 49 695 A1 | 4/2001 |
| DE | 20 2007 013 238 U1 | 3/2009 |
| DE | 10 2013 204 704 A1 | 10/2014 |

* cited by examiner

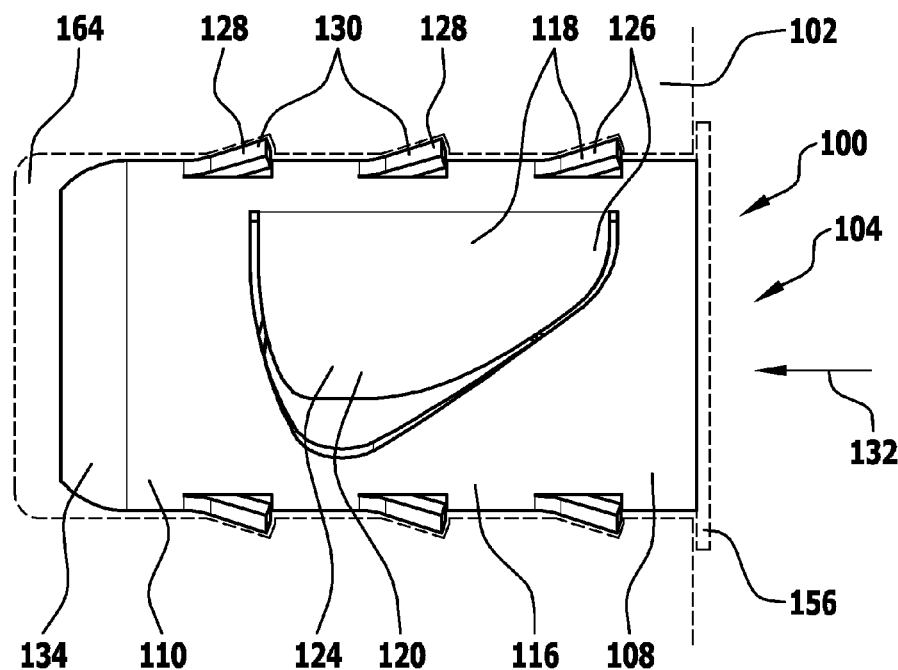
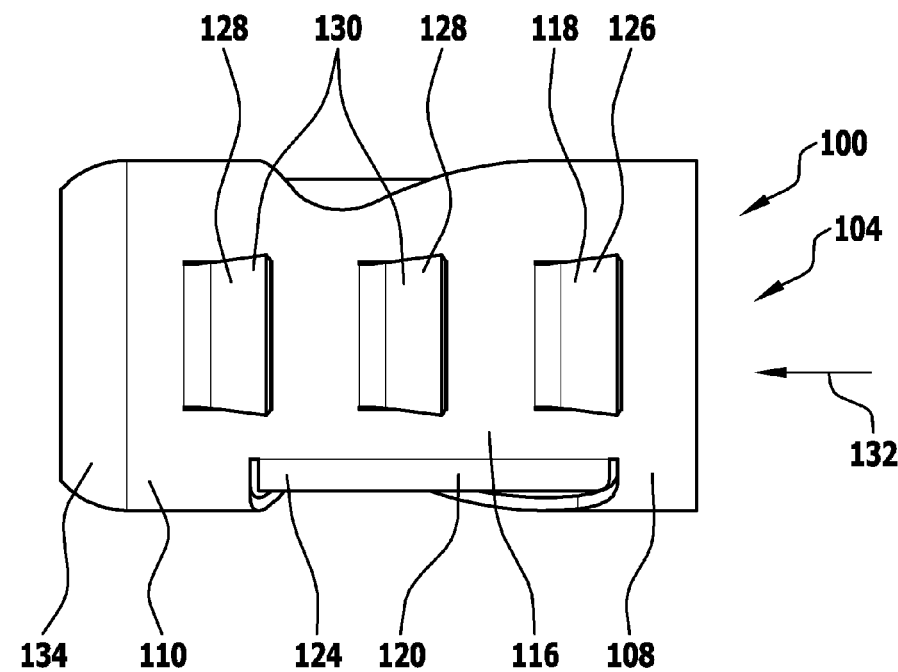

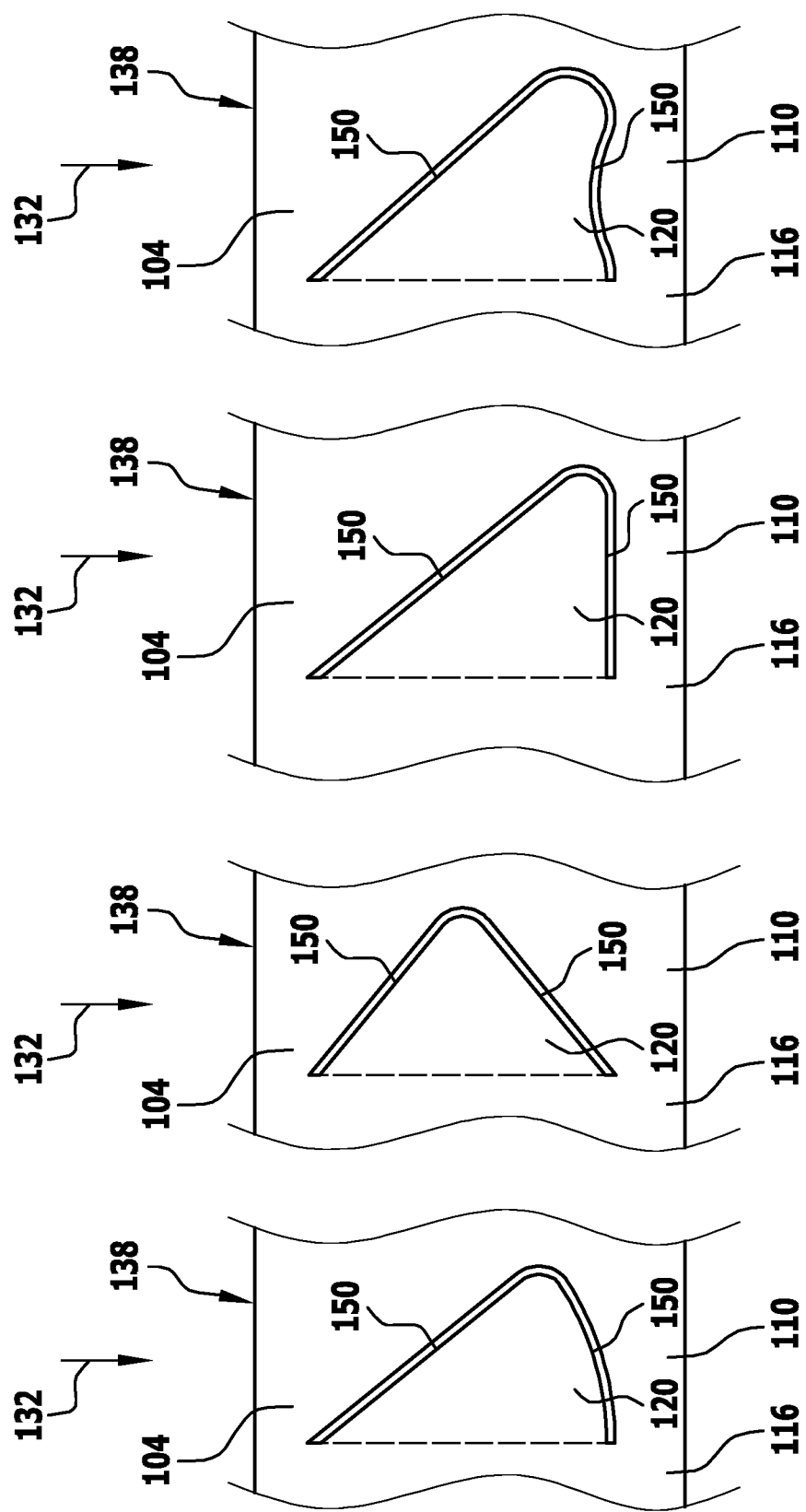

DOWEL ELEMENT, FASTENING DEVICE, METHOD FOR PRODUCING A DOWEL ELEMENT, AND METHOD FOR INSTALLING A FASTENING DEVICE

RELATED APPLICATION

This application is a continuation of international application No. PCT/EP2016/052263 filed on Feb. 3, 2016, and claims the benefit of German application No. 10 2015 202 593.4 filed on Feb. 12, 2015 which are incorporated herein by reference in their entirety and for all purposes.

FIELD OF DISCLOSURE

The present invention relates to an anchor element for fastening an article to a further article.

BACKGROUND

An anchor element may for example be a plastics component into which a screw is screwable in order to fix two articles to one another.

SUMMARY OF THE INVENTION

The object of the present invention is to provide an anchor element which is simple and inexpensive to produce and enables an article to be fastened to a further article simply and reliably.

This object is achieved according to the invention by an anchor element for fastening an article to a further article, wherein the anchor element includes a base body that takes a hollow form, at least in certain regions, and surrounds a receiving space for receiving a fastening element, wherein the base body includes one or more elastically yielding spring elements that are formed by one or more wall portions of the base body, and these project into the receiving space in an installed condition of the anchor element.

Because the anchor element includes one or more elastically yielding spring elements that project into the receiving space in an installed condition of the anchor element, a fastening element may be connected to the anchor element simply and reliably in order ultimately to connect two articles to one another reliably.

The expression "an installed condition of the anchor element" should preferably be understood to mean a condition in which a fastening element is arranged in the receiving space of the anchor element and/or projects into the receiving space of the anchor element, wherein the fastening element is fixed in the receiving space by means of one or more spring elements, in particular being fixed by latching or clamping.

An installed condition of the anchor element should preferably be distinguished from a condition of the anchor element that is prepared for installation. In this condition of the anchor element that is prepared for installation, it may be provided for the anchor element to be pushable into an opening or bore in an article. Here, one or more spring elements of the anchor element preferably project into the receiving space and/or are held in a deflected position for the purpose of holding the spring elements in a pre-stressed position.

A condition of the anchor element that is prepared for installation is in particular a condition of the anchor element in which the latter is ready or prepared for receiving a fastening element.

It may be provided for individual, a plurality of or all the features described in relation to the installed condition of the anchor element to be realised both in the installed condition and also in a condition prepared for installation. However, it may also be provided for individual, a plurality of or all the features described in relation to the installed condition to be realised only in the installed condition and not in a condition prepared for installation. For example, it may be provided for one or more spring elements not to project into the receiving space of the anchor element in a condition of the anchor element that is prepared for installation.

It may be advantageous if the base body of the anchor element takes an at least approximately hollow-cylindrical form.

In this case, the base body may have for example a substantially circular cross section. It may further be provided for the base body to have an elliptical or elongate or indeed rectangular cross section.

Here, a cross section is in particular a cross section taken transversely to a direction of connection in which a fastening element is introducible into the receiving space of the base body.

It may be advantageous if the base body has a constant material thickness at least approximately throughout.

In this regard, it should in particular be understood that the base body has at least approximately the same material thickness everywhere.

The base body is preferably made of a metal material and/or a plastics material, or includes a metal material and/or a plastics material.

In one embodiment of the invention, it is provided for the base body to be made from a metal sheet.

It may be favourable if the base body includes one or more elastically yielding spring elements, which are formed by one or more wall portions of the base body that project into the receiving space in a spiral shape in an installed condition of the anchor element.

Here, the expression "project in a spiral shape" should in particular be understood to mean that one or more spring elements project both along a peripheral direction of the anchor element and also radially inwards into the receiving space.

One or more spring elements of the base body preferably each have two lateral flanks.

Here, lateral flanks are in particular the side edges of a spring element that extend from a sleeve of the base body (initial region) to an inwardly projecting end of the spring element.

The lateral flanks of one or more spring elements preferably form mutually different angles with a direction of connection of the anchor element.

As an alternative thereto, it may be provided for the flanks to form like angles with the direction of connection of the anchor element.

It may be advantageous if one or more spring elements are formed such that they taper in the direction of an end projecting into the receiving space.

One or more spring elements preferably form latching springs for latching the fastening element in the anchor element.

The spring elements may create a reversible or indeed irreversible fixing of the fastening element to the anchor element, for example in dependence on a shape of a fastening portion of a fastening element and/or in dependence on a lateral flank of one or more spring elements that is remote from an insertion opening.

In particular, as a result a detachable or non-detachable undercut may be provided between the one or more spring elements and the fastening portion of the fastening element.

In one embodiment of the invention, it may be provided for the base body to include an insertion opening for inserting the fastening element into the receiving space.

One or more spring elements each preferably have two lateral flanks, wherein a lateral flank of a respective spring element that faces the insertion opening preferably forms a smaller angle with a direction of connection than a lateral flank of this spring element that is remote from the insertion opening.

In the case of a curved flank, or one that is not straight in some other way, in order to determine the angle use must be made in particular of an average angle and/or to a straight line that runs from a start of the flank, at the sleeve, to an end of the flank, at an inwardly projecting end of the spring element.

It may be favourable if the base body of the anchor element includes a sleeve that forms a wall of the anchor element.

Preferably, in an installed condition of the anchor element, the one or more spring elements of the base body project from the sleeve into the receiving space.

Preferably, in at least one condition of the base body, a wall portion of the base body is a constituent part of a wall forming the sleeve, or is at least shaped such that the wall portion can be moved into a wall forming the sleeve, and in particular may be inserted into an opening in the sleeve that is formed to be substantially complementary with the wall portion.

The base body of the anchor element is preferably formed in one piece.

In particular, it may be provided for the sleeve, one or more spring elements and/or one or more anchoring elements of the anchor element to be formed in one piece with one another.

In particular, it may be provided for the base body to be a one-piece product of sheet-metal shaping. In this case, in particular the sleeve, the one or more spring elements and/or the one or more anchoring elements of the anchor element are formed by a one-piece product of sheet-metal shaping.

It may be advantageous if the anchor element includes one or more anchoring elements for anchoring the anchor element in an article.

An anchoring element is in particular a projection or a latching lug that extends outwards from the sleeve, away from the receiving space.

Preferably, one or more anchoring elements take the form of a shaped and/or springy region of the sleeve and/or the base body.

It may be provided for one or more anchoring elements to surround the sleeve substantially in a ring shape.

For example, one or more anchoring elements may be formed by spring tabs.

In one embodiment of the invention, it may be provided for the anchor element to be fixable in an undercut bore in an article, in particular being latchable. For example, a bore of this kind may be produced using a T-shaped milling cutter by boring and circular milling. One or more anchoring elements are preferably engageable with the bore, in particular such that the one or more anchoring elements act on the undercut with positive engagement.

It may be favourable if one or more anchoring elements are formed by wall portions of the base body. In an installed condition of the anchor element, these wall portions preferably project outwards from the sleeve, away from the receiving space.

It may be favourable if, in a condition that is prepared for installation of the anchor element, one or more anchoring elements project from the sleeve at least in certain regions into the receiving space.

For the purpose of anchoring the anchor element in an article, the one or more anchoring elements are preferably actuable, in particular by elastic or plastic shaping.

For example, it may be provided for one or more anchoring elements to be movable out of the receiving space by means of the fastening element or a separate tool and thus to be movable into an article for the purpose of anchoring the anchor element.

One or more anchoring elements preferably form barbs for anchoring the anchor element in an article.

It may be advantageous if one or more anchoring elements form an external thread of the anchor element.

An external thread of this kind may in particular be a fragmented external thread that comprises a plurality of individual, mutually spaced anchoring elements that each form only one portion of an external thread.

It may be advantageous if the anchor element includes one or more locking elements for locking one or more spring elements in a pre-stressed condition.

In particular by means of the one or more locking elements, the one or more spring elements are lockable such that they are pre-stressed in a condition of the anchor element ready for installation of the anchor element and/or in a condition of the anchor element ready for receiving a fastening element.

It may be favourable if, by means of one or more locking elements, one or more spring elements are pre-stressed or capable of being pre-stressed in a condition ready for installation of the anchor element in or on an article.

A pre-stressed condition of one or more spring elements is in particular a condition in which the one or more spring elements are moved from a relaxed position, in which the one or more spring elements project into the receiving space of the base body, into a position under stress. The position under stress is in particular a position in which the one or more spring elements are arranged in a respective opening or recess in a wall of the base body that forms the sleeve.

It may be favourable if one or more locking elements are formed by wall portions of the base body.

The one or more locking elements preferably project into the receiving space.

It may be favourable if, when a fastening element is inserted into the receiving space, one or more locking elements are actuable, in particular for the purpose of releasing one or more spring elements.

The one or more locking elements are in this case preferably shaped or pushed away or moved in another way, in particular in order to release one or more spring elements from the pre-stressed condition.

In one embodiment of the invention, it may be provided for the anchor element to include two or more spring elements that are arranged one behind the other in a direction of connection. In this way, it is possible in particular for a stepwise fixing of a fastening element in the anchor element and/or a fixing of the fastening element to different depths within the anchor element to be performed.

As an alternative or in addition to this, it may be provided for the anchor element to include two or more spring elements that are arranged next to one another in relation to a direction of connection and/or peripheral direction.

In particular, the ends of two or more spring elements are arranged in the direction of connection at least approximately at the same height.

It may be advantageous if the base body includes an insertion opening, through which a fastening element is insertable into the receiving space, and a fastening opening opposite the insertion opening. In the region of the fastening opening, the base body preferably takes a tapering form and/or includes one or more inwardly projecting portions.

A screw element is preferably receivable by means of the fastening opening, for the purpose of screwing the anchor element tight onto or into an article. In particular, the fastening opening forms an undercut portion as a result of the one or more inwardly projecting portions and/or as a result of the tapering form, and a screw head of a screw element can in particular be engaged at this undercut portion.

It may be advantageous if the anchor element includes one or more fluid receptacles for receiving a fluid, in particular for receiving adhesive.

One or more fluid receptacles are preferably arranged on one or more spring elements.

Preferably, one or more fluid receptacles are actuable by damage thereto, so that fluid can emerge.

The one or more fluid receptacles are preferably actuable by moving one or more spring elements.

By actuating one or more fluid receptacles, the fluid, for example adhesive, is preferably releasable in the region of the anchor element, in particular in order to fix the anchor element in or on the article and/or to fix the fastening element in the anchor element.

It may be favourable if the anchor element is an element in the form of a closed ring, in particular in relation to a peripheral direction that runs substantially perpendicular to a direction of connection.

As an alternative to this, it may be provided for the anchor element to have an expansion gap that runs substantially parallel or obliquely to the direction of connection.

In this connection, a sleeve of the anchor element preferably takes a form that is elastically yielding in the peripheral direction.

In particular, the anchor element may as a result be inserted into an opening in an article in a clamping manner, in order to simplify installation of the anchor element.

The anchor element described above is particularly suitable for use in a fastening device.

For this reason, the present invention also relates to a fastening device for fastening an article to a further article.

A fastening device of this kind according to the invention preferably includes one or more anchor elements, in particular anchor elements according to the invention, and one or more fastening elements for inserting and fixing thereof in the one or more anchor elements.

The fastening device according to the invention preferably has individual or a plurality of the features and/or advantages described in conjunction with the anchor element according to the invention.

It may be favourable if one or more fastening elements each include one or more fastening portions by means of which the one or more fastening elements are fixable in one or more receiving spaces of one or more anchor elements.

In particular, the one or more fastening portions are engageable with one or more spring elements of one or more anchor elements.

A fastening portion of a fastening element may for example be a head of a screw element.

In particular, it may be provided for a fastening portion to be a substantially mushroom-shaped end of a fastening element.

It may be favourable if one or more fastening elements each include one or more anchoring portions by means of which the one or more fastening elements are fixable on or in one or more articles.

An anchoring portion is in particular a screw portion or a latching portion for screwing or latching the fastening element onto or into an article.

Further, it may be provided for one or more anchoring portions to be formed by a connection element that includes one or more non-self-tapping projections that are in the shape of a circle portion and are engageable in a groove, of a shape substantially complementary therewith, in an article.

As an alternative or in addition thereto, it may be provided for one or more anchoring elements of an anchor element to be formed by a connection element of this kind.

A connection element that includes one or more non-self-tapping projections in the shape of a circle portion has in particular one or more curved support faces that are in the shape of a circular arc in a longitudinal section.

In one embodiment of the invention, it may be provided for one or more fastening elements each to include one or more abutment portions by means of which the one or more fastening elements are positionable in a predetermined position on or in one or more articles.

An abutment portion is for example a substantially annular projection that in particular adjoins an anchoring portion of a fastening element.

In particular, in the case of an anchoring portion that takes the form of a screw portion, an abutment portion can ensure that the fastening element is not screwed too far into an article.

It may be favourable if one or more fastening elements include in each case one or more fastening portions, in each case one or more anchoring portions and in each case one or more connection portions, wherein in each case a connection portion is arranged between an anchoring portion and a fastening portion of a fastening element.

In relation to a longitudinal centre axis of the fastening element, the connection portion preferably has a smaller extent in the radial direction than an adjacent anchoring portion and/or an adjacent fastening portion.

A fastening element preferably takes a substantially rotationally symmetrical form.

It may be favourable if a fastening element has a contoured, in particular ribbed, connection portion.

The connection portion may for example be contoured or ribbed in the direction of connection.

Preferably, a contoured connection portion serves to bring the connection portion into engagement with one or more ends of one or more spring elements. This may for example produce a rotary entrainment between the fastening element and the anchor element in order for example to enable the anchor element to be unscrewed from an article together with the fastening element.

However, it is also possible to provide, by means of a contoured connection portion, a construction that secures against rotation, to prevent the fastening element from rotating in relation to the anchor element.

One or more fastening elements preferably have, at least in certain regions, an at least approximately T-shaped longitudinal section.

A longitudinal section is in particular a longitudinal section that is taken along the longitudinal centre axis.

It may be favourable if an end of a fastening portion of a fastening element that is remote from an anchoring portion of the fastening element is formed to taper in the direction away from the anchoring portion. In this way, the fastening element is insertable into the receiving space of the anchor element in a simple manner, in particular being guidable past one or more spring elements.

However, it may also be provided for an end of a fastening portion of a fastening element that is remote from an anchoring portion of the fastening element to take a form running perpendicular to the direction of connection.

An end of a fastening portion of a fastening element that faces an anchoring portion of the fastening element is preferably formed to taper towards the anchoring portion. In this way, the fastening element may preferably be detachably fixed to the anchor element.

Further, it may be provided for an end of a fastening portion of a fastening element that faces an anchoring portion of the fastening element to take a form running perpendicular to the direction of connection. In this way, and in particular depending on the shape of the lateral flanks of one or more spring elements, the fastening element may be non-detachably fixed to the anchor element.

In one embodiment of the invention, it may be provided for an end of a fastening portion of a fastening element that is remote from an anchoring portion of the fastening element to be provided with a tool receptacle.

A tool receptacle of this kind may for example be an opening, a recess or a portion of another shape which enables a tool to be applied. For example, a tool receptacle may be a slot receptacle, a crosshead receptacle or an Allen key receptacle in order to enable an appropriately shaped screwdriver to be applied.

Using the tool receptacle, the fastening element may preferably be actuated in particular for anchoring the fastening element in or on an article. For example, it may be provided for the anchoring portion to take the form of a screw portion and for the fastening element to be screwable into an article by means of a screwdriver that is applied to the tool receptacle.

Preferably, it is provided for one end of a fastening element to be anchored or anchorable in or on an article, while the further end of the fastening element is fixed or fixable in the anchor element.

Here, it may be provided for only one end of a fastening element to be anchored to an article with the anchor element, while the further end is directly fixed, for example being screwed tight, to the further article, in particular by means of the anchoring portion of the fastening element.

As an alternative to this, it may be provided for two mutually opposite ends of a fastening element to be fixable, in particular anchorable, to a respective article by means of a respective anchor element.

The present invention further relates to a method for producing an anchor element, in particular an anchor element according to the invention.

In this respect, the object of the invention is to provide a method by means of which an anchor element is producible simply and inexpensively.

This object is achieved according to the invention in that the method for producing an anchor element includes the following:

providing a sheet-metal material;

making cuts and/or openings in the sheet-metal material, in order to form one or more spring elements;

shaping the sheet-metal material in order to produce a sleeve of the anchor element and/or to shape and/or to put into a pre-stressed position the one or more spring elements.

The method according to the invention for producing an anchor element preferably has individual or a plurality of the features and/or advantages described in conjunction with the anchor element according to the invention and/or the fastening device according to the invention.

It may be favourable if the sheet-metal material is prepared as a flat strip material and/or cut to size.

The cuts and/or openings are preferably made in the sheet-metal material by a laser cutting method and/or a punching method.

It may be favourable if, for the purpose of forming one or more anchoring elements, cuts and/or openings are made in the sheet-metal material.

The sheet-metal material is preferably bent substantially into a ring shape in order to produce the wall of the sleeve of the anchor element.

Further, it may be provided for one or more spring elements to be bent at a more pronounced curvature than the part of the sheet-metal material forming the sleeve, with the result that the one or more spring elements project into the receiving space of the anchor element.

The present invention further relates to a method for installing a fastening device.

In this respect, the object of the invention is to provide a method by means of which two articles are reliably fixable to one another.

According to the invention, this object is achieved in that the method for installing a fastening device includes the following:

providing a fastening device, in particular a fastening device according to the invention;

inserting the anchor element into an opening in an article, and anchoring the anchor element in the opening;

fixing one end of the fastening element to or in a further article;

inserting a further end of the fastening element into the receiving space of the anchor element, in order to produce a connection between the two articles.

The method according to the invention for installing a fastening device preferably includes individual or a plurality of the features and/or advantages that are described in conjunction with the anchor element according to the invention, the fastening device according to the invention and/or the method according to the invention for producing an anchor element.

Further, the anchor element according to the invention, the fastening device according to the invention and/or the methods according to the invention may have individual or a plurality of the features and/or advantages described below:

The invention is suitable in particular for use in furniture manufacture, woodworking, façade construction, automotive construction, mechanical engineering or electrical engineering.

In principle, the invention is suitable for connecting components and articles of any kind.

The sleeve of the anchor element may for example take a circular-cylindrical or also conical form. Here, the cone angle is preferably at most approximately 10°, for example at most approximately 5°.

It may be advantageous if the anchor element undergoes a heat treatment after the shaping thereof, in particular after the shaping of one or more spring elements.

As the material for the anchor element, strip steel or spring steel may in particular be provided.

It may further be provided for the anchor element and/or the fastening element to take the form of an injection moulded component, in particular an injection moulded plastics component.

In order to actuate one or more anchoring elements of the anchor element, it is possible for example to provide a tool similar to crimping pliers, in particular in order to bend the anchoring elements out of the receiving space of the anchor element and to bring them into engagement with the article.

The anchoring elements are preferably plastically deformed in order to ensure reliable fixing of the anchor element.

Preferably, the spring elements are elastically deformed when the fastening element is inserted into the receiving space.

Further preferred features and/or advantages of the invention form the subject matter of the description below and of the representation in the drawings of exemplary embodiments.

BRIEF DESCRIPTION OF THE DRAWINGS

FIG. 3 shows a schematic side view of the anchor element from FIG. 3 with an article indicated in dashed lines, in which the anchor element is arranged;

FIG. 4 shows a further schematic side view of the anchor element from FIG. 1;

FIG. 23 shows an alternative embodiment of a spring element of an anchor element, wherein a relatively long straight lateral flank and a relatively short curved lateral flank are provided;

FIG. 24 shows an alternative embodiment of a spring element of an anchor element, wherein two straight lateral flanks of the same length are provided;

FIG. 25 shows a further alternative embodiment of a spring element of an anchor element, wherein a long straight lateral flank and a short straight lateral flank are provided;

FIG. 26 shows a further alternative embodiment of a spring element of an anchor element, wherein a long straight lateral flank and an undulating short lateral flank are provided;

Like or functionally equivalent elements are provided with the same reference numerals in all the Figures.

DETAILED DESCRIPTION OF THE DRAWINGS

Figure 1:
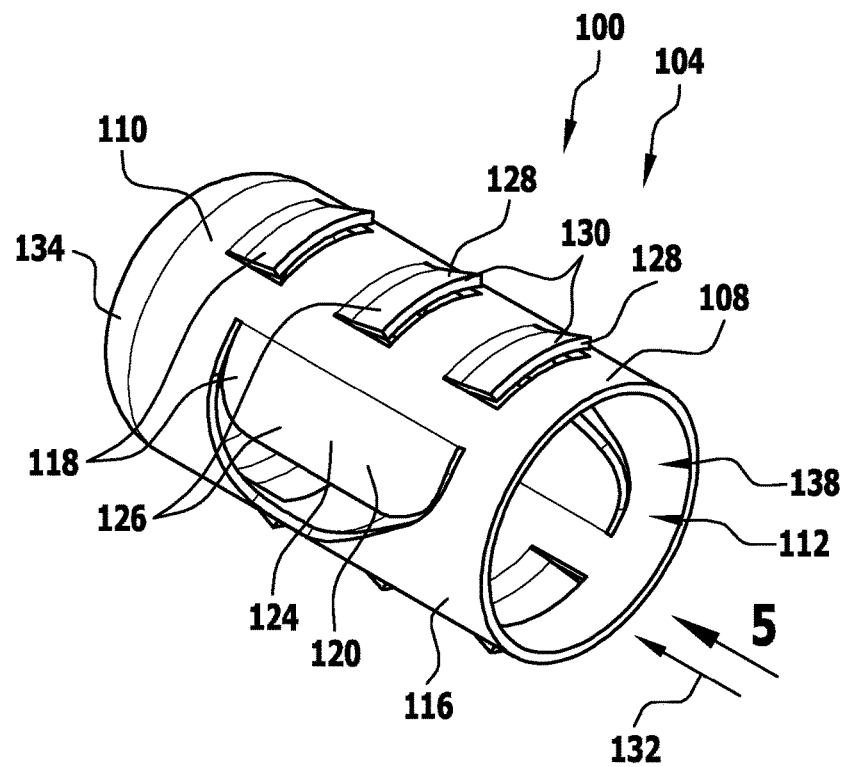
FIG. 1 shows a schematic perspective illustration of a first embodiment of an anchor element of a fastening device, wherein the anchor element includes two spring elements and six anchoring elements that are arranged on a sleeve of the anchor element.
Figure 2:
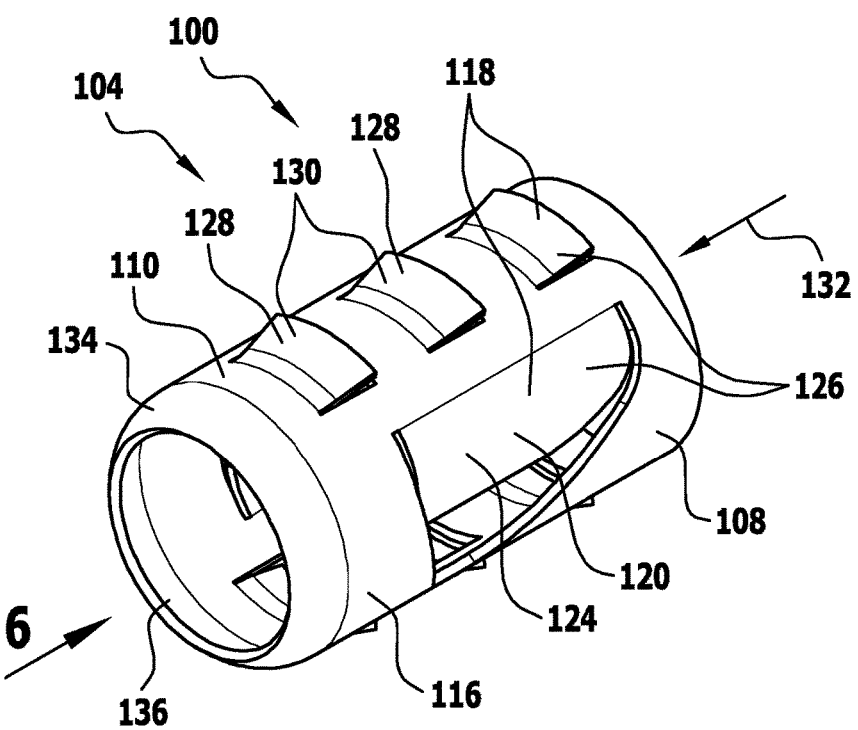
FIG. 2 shows a further schematic perspective illustration of the anchor element from FIG. 1.

A first embodiment, illustrated in FIGS. 1 to 13, of a fastening device that is designated 100 as a whole serves for example to connect two articles 102 to one another.

A fastening device 100 of this kind may for example be used in furniture manufacture in order to connect two panel elements or other components of a piece of furniture to one another.

The fastening device 100 includes an anchor element 104 (see FIGS. 1 to 7) and a fastening element 106 (see FIGS. 8 to 11).

The anchor element 104 includes a base body 108 that includes a substantially hollow-cylindrical sleeve 110.

The base body 108, in particular the sleeve 110, surrounds a receiving space 112 of the anchor element 104.

The receiving space 112 serves in particular to receive a fastening portion 114 of a fastening element 106.

The base body 108 includes a wall 116 that in particular forms the sleeve 110.

The wall 116 of the base body 108 is formed such that it is partly interrupted.

In particular, wall portions 118 that project out of the wall 116 forming the sleeve 110 are provided.

Here, there are provided in particular one or more wall portions 118 that project into the receiving space 112. These wall portions 118 are in particular spring elements 120 of the anchor element 104.

Figure 5:
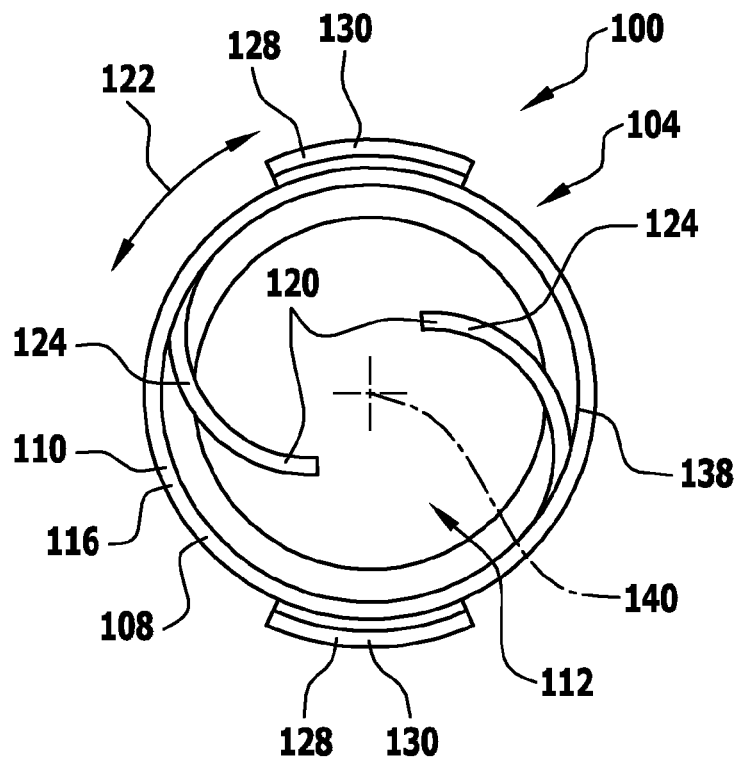
FIG. 5 shows a schematic plan view of a side of the anchor element from FIG. 1, this side being provided with an insertion opening, with the direction of view in the direction of the arrow 5 in FIG. 1.
Figure 6:
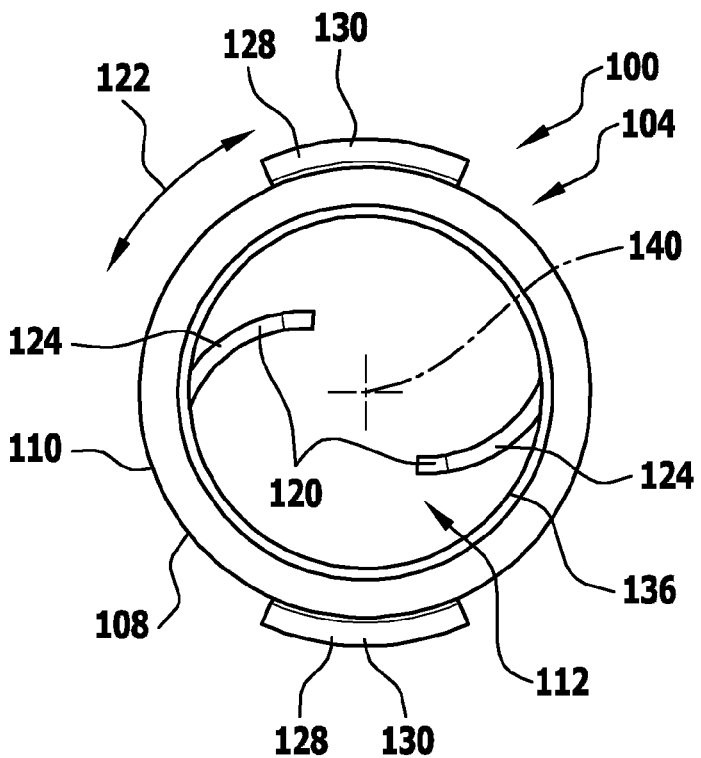
FIG. 6 shows a schematic plan view of a side of the anchor element from FIG. 1, this side being provided with a fastening opening, with the direction of view in the direction of the arrow 6 in FIG. 2.

As can be seen in particular from FIGS. 5 and 6, these spring elements 120 project into the receiving space 112 of the anchor element 104 substantially in a spiral shape.

Here, the spring elements 120 extend from the sleeve 110 inwards into the receiving space 112 and at the same time along a peripheral direction 122 of the anchor element 104.

The spring elements 120 in particular serve to latch a fastening element 106 in the receiving space 112 of the anchor element 104. The spring elements 120 are thus in particular latching springs 124.

The spring elements 120 in particular take the form of tabs 126 that extend from the sleeve 110 into the receiving space 112.

The spring elements 120 are preferably elastic in form, so that they can be moved in a reversibly elastic manner from the relaxed position (rest position) illustrated in FIGS. 1 to 6 outwards, in the direction of the sleeve 110. Because of the elasticity, this puts the spring elements 120 under stress, with the result that the spring elements 120 can come back into the rest position illustrated in FIGS. 1 to 6 by themselves.

The anchor element 104 moreover includes one or more anchoring elements 128, which are preferably likewise formed by wall portions 118 in the base body 108 but in this case project outwards away from the receiving space 112.

The anchoring elements 128 are in particular barbs 130 for fixing the anchor element 104 in an article 102 (see FIG. 3).

For the purpose of simple installation of the anchor element 104, it may moreover be provided for an end of the anchor element 104 that is to the front in relation to a direction of connection 132 of the fastening device 100 to be provided with an introduction ramp 134.

In this case, the introduction ramp 134 preferably surrounds a fastening opening 136 for the purpose of fixing the anchor element 104 to an article 102.

Figure 45:
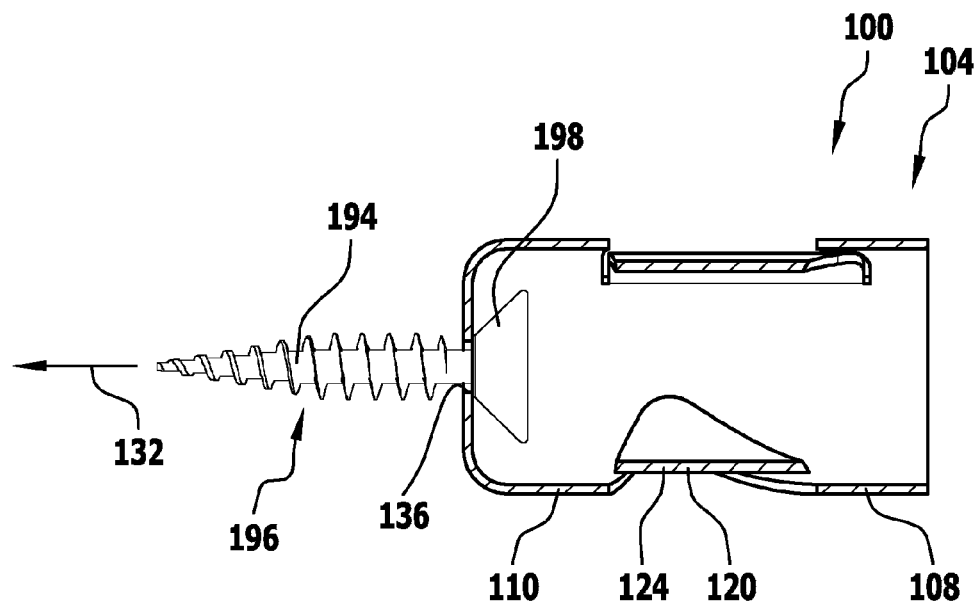
FIG. 45 shows a schematic illustration of an alternative embodiment of an anchor element which is fixable to an article, in the region of a fastening opening in the anchor element, by means of a screw.

The functioning of the fastening opening 136 is explained separately, with reference to FIG. 45.

The anchor element 104 is preferably provided with an insertion opening 138.

The insertion opening 138 enables a fastening element 106 to be inserted into the receiving space 112 of the anchor element 104.

The insertion opening 138 and the fastening opening 136 are preferably arranged at mutually opposite ends of the anchor element 104.

The anchor element 104 may in particular take a substantially rotationally symmetrical form in relation to a longitudinal centre axis 140 of the anchor element 104.

The anchor element 104 in that case has in particular a hollow-cylindrical sleeve 110 of circular cross section.

Figure 7:
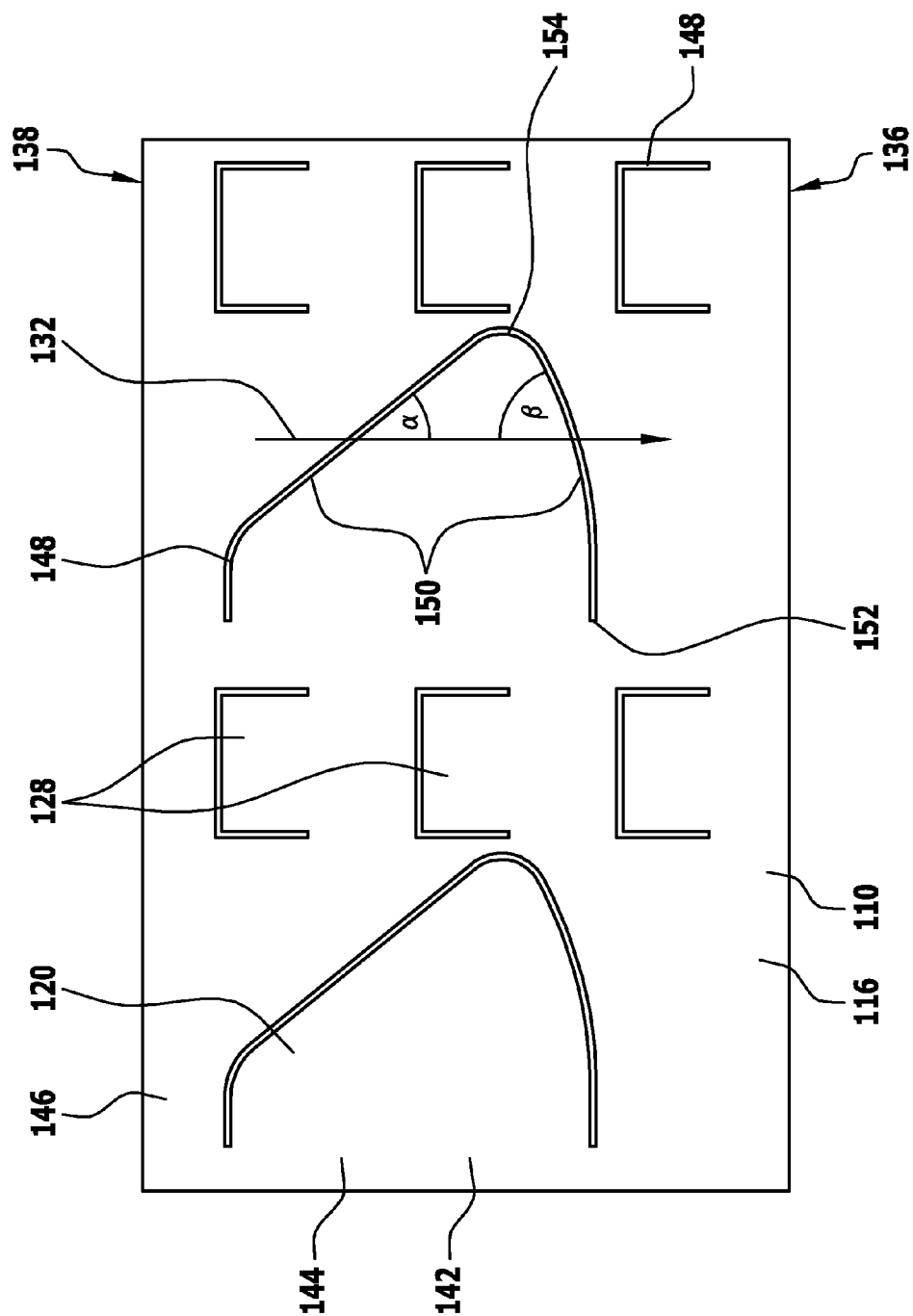
FIG. 7 shows a schematic illustration of a punched or stamped metal sheet for producing the anchor element from FIG. 1.
Figure 9:
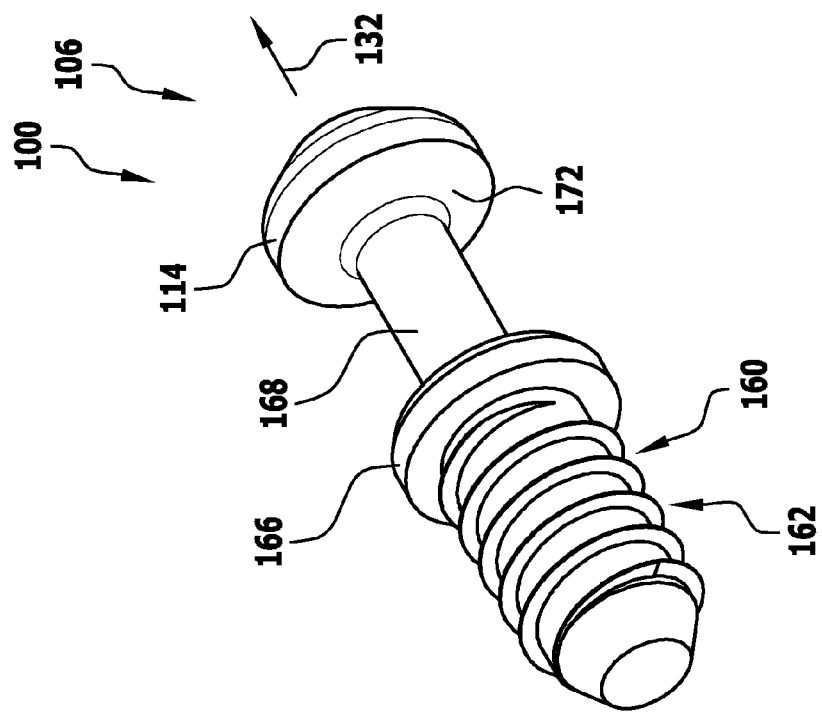
FIG. 9 shows a further schematic perspective illustration of the fastening element from FIG. 8.
Figure 8:
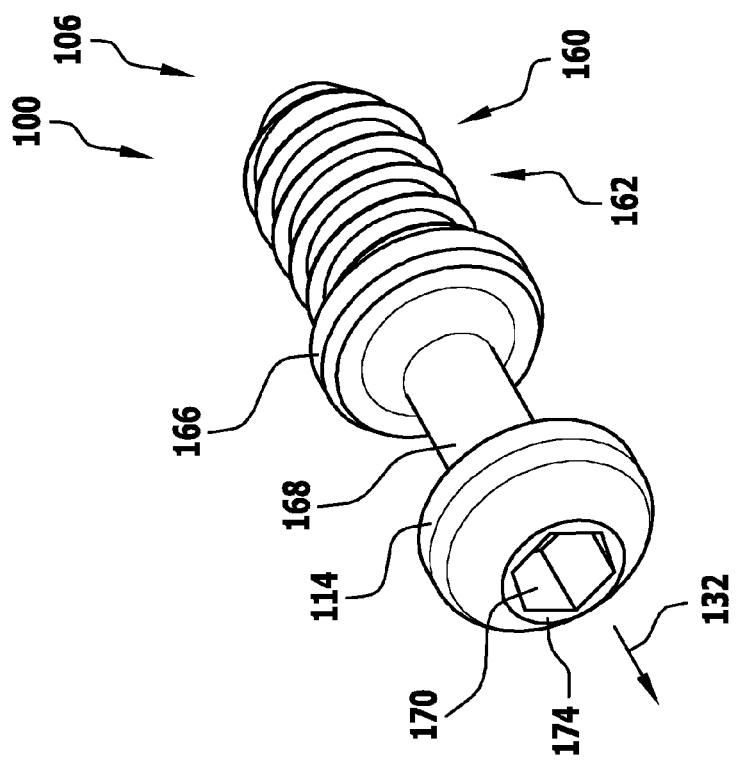
FIG. 8 shows a schematic perspective illustration of a fastening element of the fastening device, wherein the fastening element includes a fastening portion for fixing in an anchor element, an anchoring portion for anchoring the fastening element in an article, and an abutment portion for the directed positioning of the fastening element in relation to the article.
Figure 11:
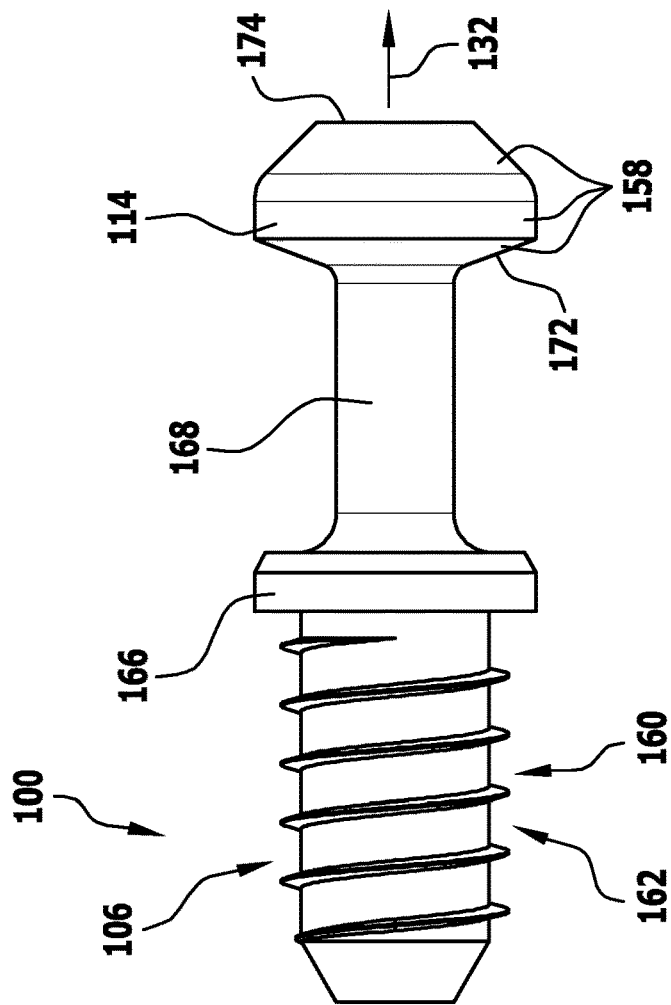
FIG. 11 shows a schematic side view of the fastening element from FIG. 8.
Figure 10:
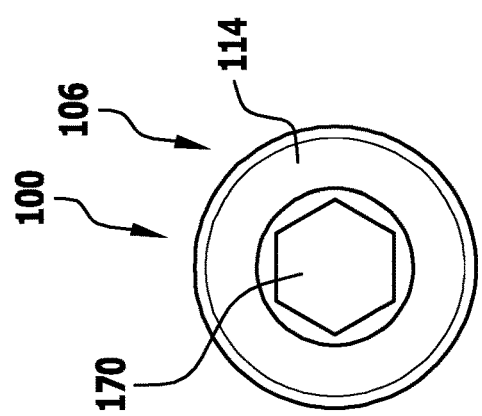
FIG. 10 shows a schematic plan view of an end of the fastening element from FIG. 8 that is provided with a tool receptacle.

As can be seen in particular from FIG. 7, the anchor element 104 may for example be formed from a flat strip material 142.

The flat strip material 142 is preferably a sheet-metal material 144, in particular a metal sheet 146.

In order to produce an anchor element 104, for example a metal sheet 146 of suitable external dimensions is produced, in particular being punched or cut out.

The metal sheet 146 is moreover provided with one or more cuts 148. In particular, by means of the cuts 148 the contours of the spring elements 120 and the anchoring elements 128 are made in the metal sheet 146, which otherwise forms the wall 116 of the sleeve 110.

The cuts 148 may in this case be made in the metal sheet 146 for example by means of laser cutting, punching, stamping, etc.

In a further processing step, the metal sheet 146 is formed into shape. In particular, the metal sheet 146 is bent such that the hollow-cylindrical sleeve 110 is formed.

Moreover, the spring elements 120 and the anchoring elements 128 are bent into the desired shape and position.

All these shaping procedures are preferably plastic shaping procedures, with the result that the spring elements 120 and the anchoring elements 128 may in particular be brought into the rest positions (rest locations) illustrated in FIGS. 1 to 6.

As can be seen in particular from FIG. 7, each spring element 120 has two lateral flanks 150.

The flanks 150 extend in particular from an initial region 152 of a spring element 120, adjoining the sleeve 110, to an end 154 of the spring element 120 which, in the installed condition of the anchor element 104, projects into the receiving space 112.

Here, the flanks 150 may have different shapes.

In the embodiment of the anchor element 104 that is illustrated in FIGS. 1 to 7, a lateral flank 150 that faces the insertion opening 138 is flatter in form than a lateral flank 150 of the spring element 120 that is remote from the insertion opening 138.

This means that an angle α (alpha) that is formed between the lateral flank 150 facing the insertion opening 138 and the direction of connection 132 is smaller than an angle β (beta) that is formed between the lateral flank 150 remote from the insertion opening 138 and the direction of connection 132.

The result of a configuration of this kind for the flanks 150 of the spring elements 120 is that a fastening element 106 that is inserted into the receiving space 112 of the anchor element 104 initially has to overcome little resistance, when it is moved in the direction of connection 132, in order to move along the flat flank 150 and in so doing to push the spring elements 120 outwards.

As soon as a fastening portion 114 of the fastening element 106 has been moved past the ends 154 of the spring element 120, the steep flank 150 has the effect of drawing the fastening element 106 into the receiving space 112, such that ultimately the fastening element 106 is fixed to the anchor element 104.

As indicated in FIG. 3 by a dashed line, it may be provided for the anchor element 104 to be provided, at the end of the base body 108 facing the insertion opening 138, with a collar 156 or one or more projections that project radially outwards in another way.

This may in particular enable the anchor element 104 to abut reliably against an article 102.

FIGS. 8 to 11 illustrate a first embodiment of a fastening element 106 of the fastening device 100.

The fastening element 106 includes the above-mentioned fastening portion 114, which is insertable into the receiving space 112 of the anchor element 104 in order to connect it to the anchor element 104.

The fastening portion 114 in particular takes the form of a mushroom-shaped thickening of the fastening element 106.

For example, the fastening portion 114 has a substantially T-shaped cross section.

It may be provided for the fastening portion 114 to have a plurality of sub-portions 158.

In particular, a central sub-portion 158 takes a substantially circular-cylindrical form.

Two further sub-portions 158 that are arranged on either side of the sub-portion 158 take a for example substantially conical form and taper, in particular from the central sub-portion 158 in the direction of connection 132.

Further, the fastening element 106 includes an anchoring portion 160.

The anchoring portion 160 takes the form for example of a screw portion 162 and serves to anchor the fastening element 106 in an article 102.

For example, the fastening element 106 may be screwed into a bore 164 in an article 102 by means of the anchoring portion 160.

Further, the fastening element 106 includes an abutment portion 166.

The abutment portion 166 is in particular arranged at an end of the anchoring portion 160 that faces the fastening portion 114 and serves as the limitation on movement when the fastening element 106 is fixed to the article 102.

In particular, by means of the abutment portion 166 it may be ensured that the fastening element 106 can only be screwed into the article 102 to a predetermined depth.

The abutment portion 166 in this case takes the form for example of an annular projection that projects radially outwards.

The fastening element 106 further preferably includes a connection portion 168.

The connection portion 168 is in particular arranged between the fastening portion 114 and the anchoring portion 160.

Further, the connection portion 168 is preferably arranged between the fastening portion 114 and the abutment portion 166.

The connection portion 168 is in particular a region having a radial extent that is small by comparison with the fastening portion 114.

In particular, by means of the connection portion 168 together with the fastening portion 114, a substantially T-shaped longitudinal section of the fastening element 106 is formed. As a result, the fastening element 106 can be simply inserted into the receiving space 112 of the anchor element 104 and, by means of the spring elements 120, reliably captured and fixed.

It may be favourable if the fastening portion 114 of the fastening element 106 includes a tool receptacle 170.

The tool receptacle 170 is in particular an Allen key receptacle or a crosshead receptacle or similar.

Preferably, there may be placed on the tool receptacle 170 a tool that fits it, for example in order simply to fix the fastening element 106 in the article 102, for example to screw it into the article 102.

The tool receptacle 170 is in particular arranged at an end of the fastening portion 114 that is remote from the anchoring portion 160.

Figure 12:
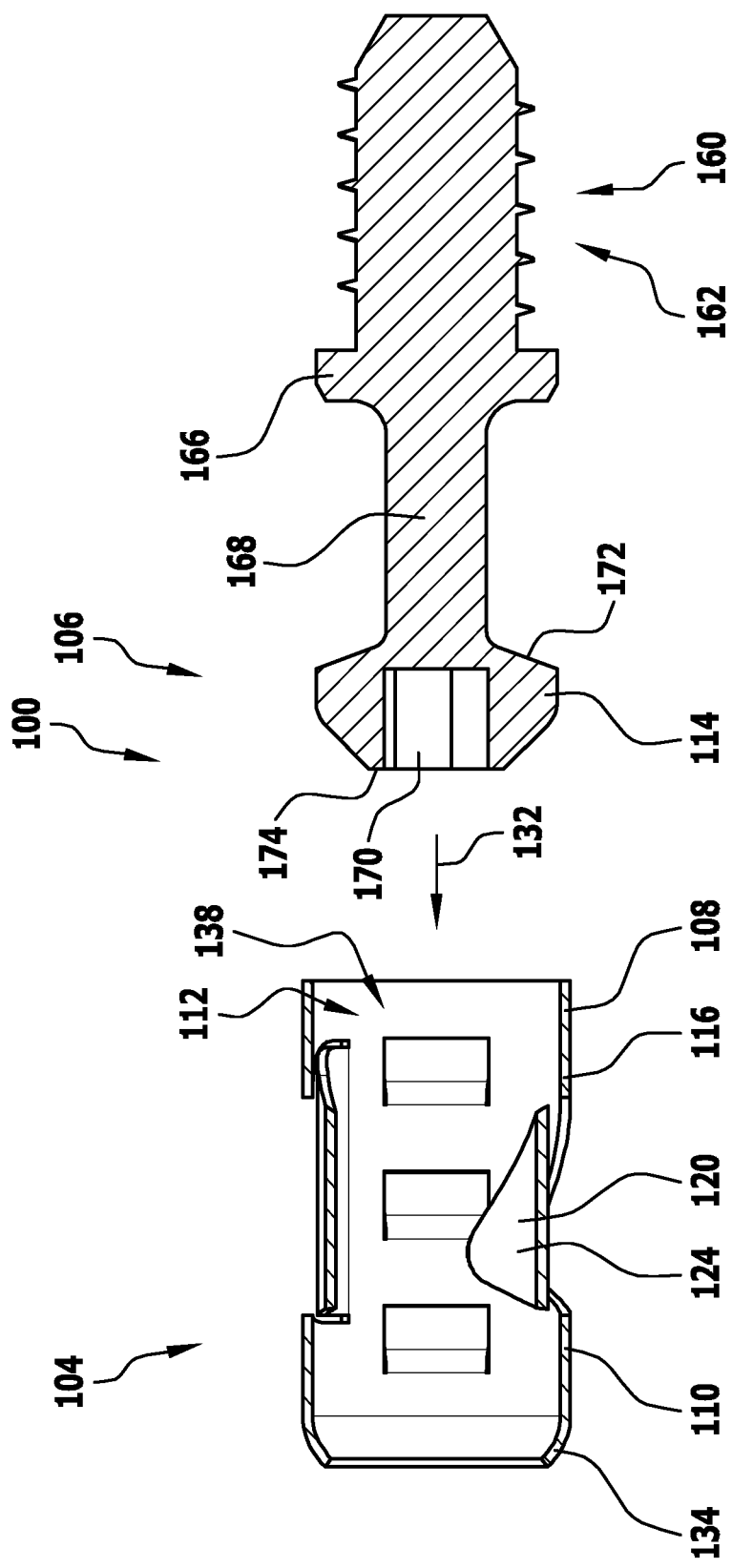
FIG. 12 shows a schematic sectional illustration of the anchor element from FIG. 1 and the fastening element from FIG. 8, in the uninstalled condition.

FIG. 12 illustrates the anchor element 104 and the fastening element 106 in an uninstalled condition.

Figure 13:
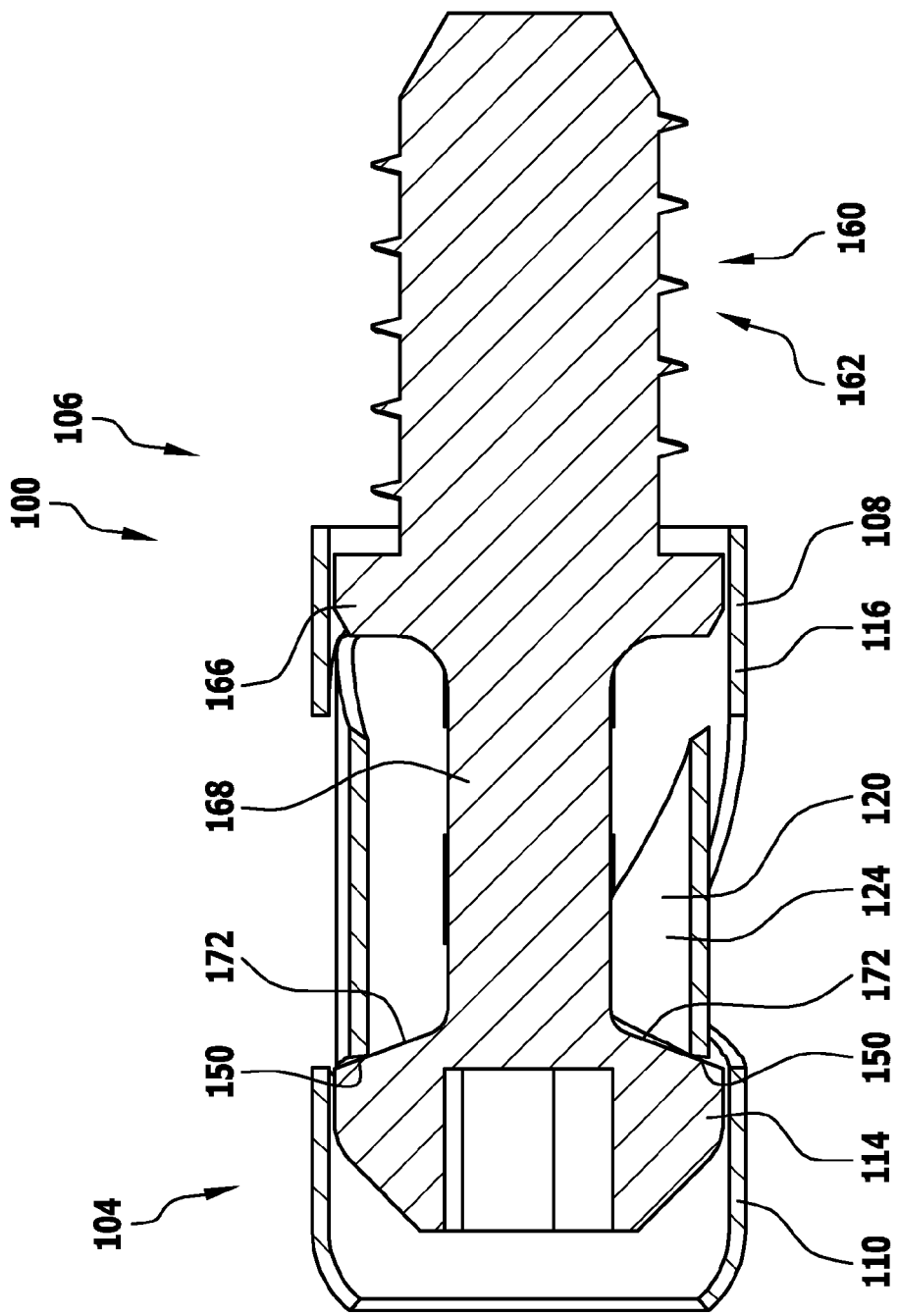
FIG. 13 shows a schematic illustration, corresponding to FIG. 12, of the anchor element from FIG. 1 and the fastening element from FIG. 8, in the installed condition.
Figure 15:
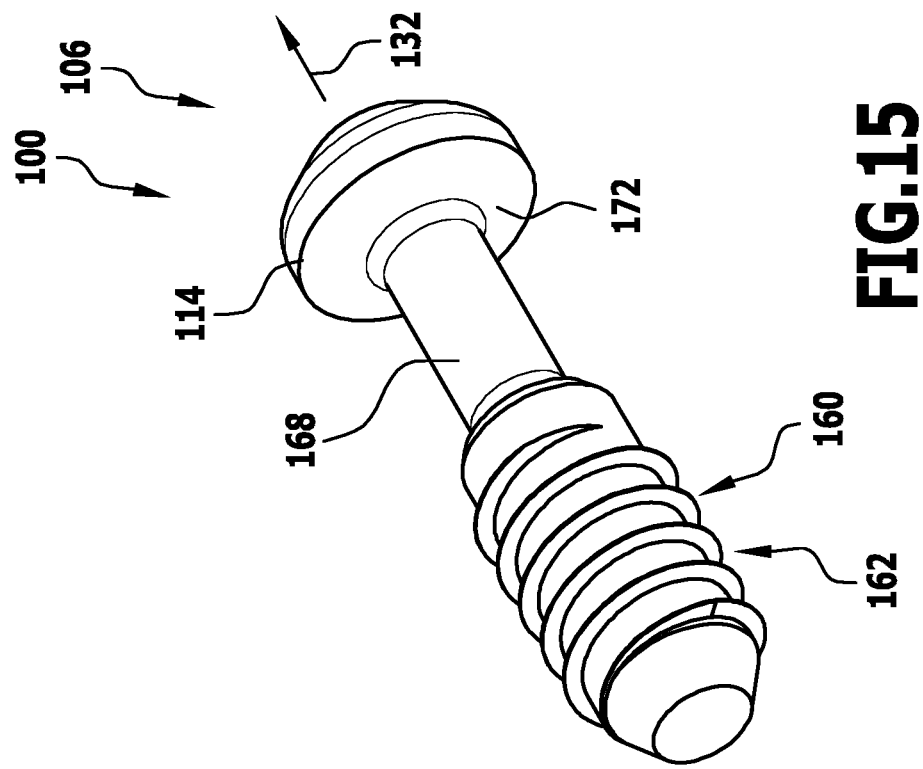
FIG. 15 shows a schematic illustration, corresponding to FIG. 9, of the fastening element from FIG. 14.
Figure 14:
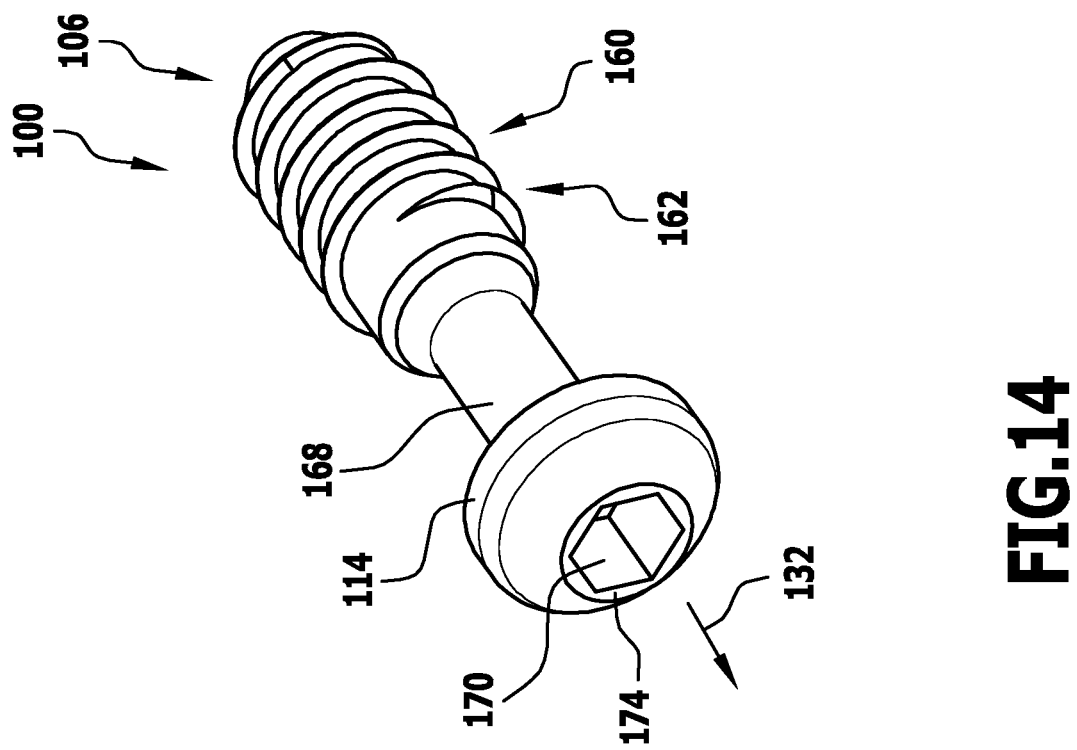
FIG. 14 shows a schematic illustration, corresponding to FIG. 8, of a second embodiment of a fastening element, in which no abutment portion is provided.
Figure 17:
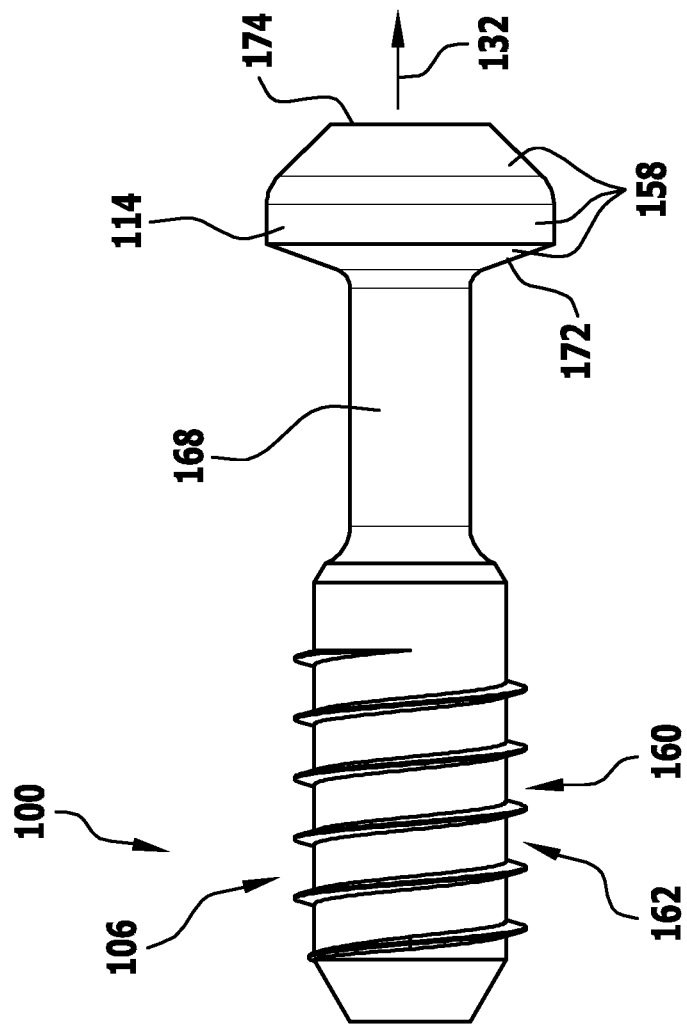
FIG. 17 shows a schematic illustration, corresponding to FIG. 11, of the fastening element from FIG. 14.
Figure 16:
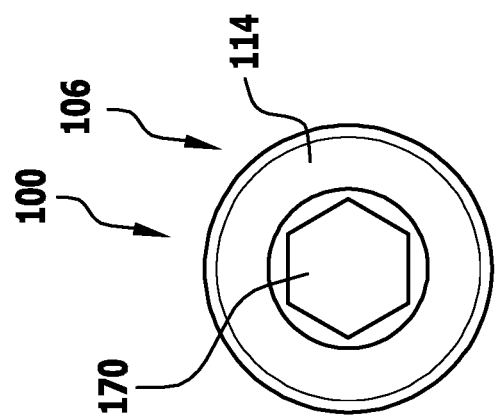
FIG. 16 shows a schematic illustration, corresponding to FIG. 10, of the fastening element from FIG. 14.

FIG. 13 shows the anchor element 104 and the fastening element 106 in an installed condition.

It can be seen in particular from a comparison of FIGS. 12 and 13 that the fastening device 100 functions as follows:

First the anchor element 104 is inserted into an article 102, in particular into a bore 164 in an article 102.

By means of the anchoring elements 128 of the anchor element 104, in this case the anchor element 104 is automatically prevented from moving the anchor element 104 in opposition to the direction of connection 132.

The fastening element 106 is fixed in a further article 102, for example being screwed into a bore 164 in a further article 102.

In a following step, the articles 102 are moved towards one another such that the fastening portion 114 of the fastening element 106 is screwed into the receiving space 112 of the anchor element 104, in the direction of connection 132.

The fastening portion 114 of the fastening element 106 is preferably dimensioned such that it at least approximately completely fills the receiving space 112 in a plane perpendicular to the direction of connection 132, and thus preferably extends peripherally as far as the wall 116.

The spring elements 120 thus project into the path of movement of the fastening portion 114 of the fastening element 106 and thus, as the fastening portion 114 moves in the direction of connection 132, come into engagement with the fastening portion 114.

Because of the shape of the lateral flanks 150 of the spring elements 120, and/or because of the shape of the one or more sub-portions 158 of the fastening portion 114, the spring elements 120 are pushed outwards by the fastening portion 114, out of the rest position illustrated in FIGS. 1 to 6, until they no longer represent an obstacle to further movement of the fastening portion 114 in the direction of connection 132.

As soon as the fastening portion 114 has moved past the ends 154 of the spring elements 120, the lateral flanks 150 of the spring elements 120 that are remote from the insertion opening 138 of the anchor element 104 bring about a retracting movement of the fastening portion 114 into the receiving space 112, since the spring elements 120 engage behind the fastening portion 114 as a result of springing back into the receiving space 112, and thus fix it in relation to the anchor element 104.

In particular, the lateral flanks 150 of the spring elements 120 that are remote from the insertion opening 138 are then in engagement with an end 172 of the fastening portion 114 that faces the anchoring portion 160.

Because the lateral flanks 150 of each spring element 120 are at different inclinations, a different force profile can be selected for the movement of pushing the fastening portion 114 into the receiving space 112 from that for the retracting movement of the fastening portion 114 that is brought about by means of the spring elements 120. In particular, it may be made easy to push in the fastening portion 114, with at the same time a strong retaining force in the installed condition.

By suitable shaping of the lateral flanks 150 and/or suitable shaping of the fastening portion 114, it is possible to produce a detachable or indeed non-detachable connection between the anchor element 104 and the fastening element 106.

In the embodiment of the fastening device 100 that is illustrated in FIGS. 1 to 13, it is provided for the fastening element 106 to be non-destructively removable from the anchor element 104 if a suitable force is applied.

Different variants and aspects of differently constructed fastening devices 100 are described below.

All the features described are combinable, individually or in combination with other features, with individual or a plurality of features of the fastening device 100 described above, as desired.

An alternative embodiment of a fastening element 106 that is illustrated in FIGS. 14 to 17 differs from the embodiment illustrated in FIGS. 8 to 11 substantially in that the fastening element 106 has no abutment portion 166.

By means of a fastening element 106 of this kind it is possible in particular to produce variable positioning in or on an article 102, for example so that different relative positions of the articles 102 to be connected to one another can be adopted in a directed way.

Otherwise, the embodiment of the fastening element 106 that is illustrated in FIGS. 14 to 17 corresponds, as regards its structure and functioning, to the embodiment illustrated in FIGS. 8 to 11, so in this respect reference is made to the descriptions thereof above.

FIGS. 18 to 22 illustrate different embodiments of fastening portions 114.

The fastening portions 114 differ in particular in the differently formed sub-portions 158.

Figure 18:
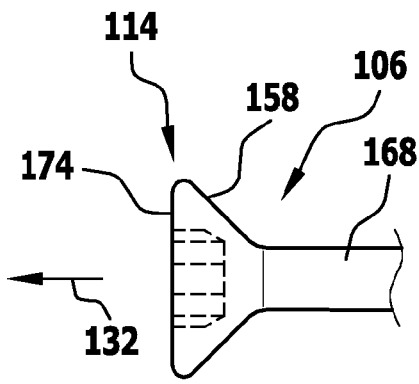
FIG. 18 shows an alternative embodiment of a fastening portion of a fastening element that has a substantially triangular longitudinal section.

In FIG. 18, only one, substantially conical sub-portion 158 of the fastening portion 114 is provided. This sub-portion 158 merges directly into a connection portion 168. An end 174 remote from the connection portion 168 takes a substantially flat form and lies in a plane perpendicular to the direction of connection 132.

A fastening portion 114 according to FIG. 18 is for example a screw head of a commercially available countersunk screw.

Figure 19:
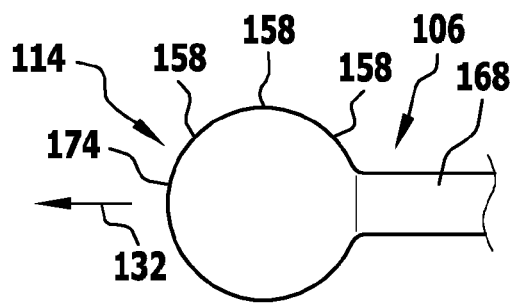
FIG. 19 shows an alternative embodiment of a fastening portion of a fastening element that is substantially spherical.
Figure 20:
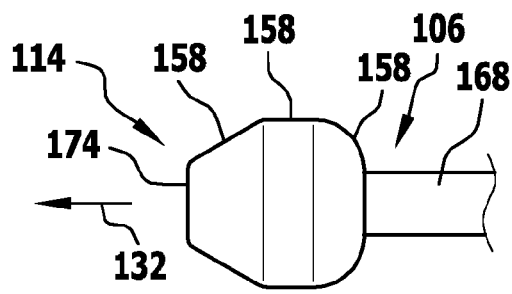
FIG. 20 shows a further alternative embodiment of a fastening portion of a fastening element, wherein a portion substantially in the shape of a portion of a sphere follows a substantially hollow-cylindrical portion, and this in turn follows a substantially conical portion.
Figure 21:
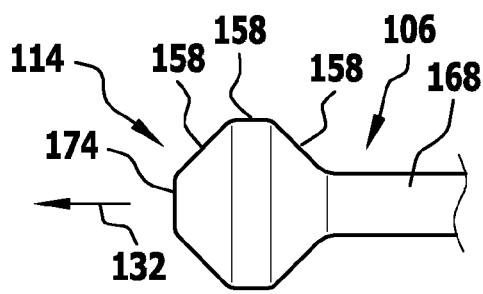
FIG. 21 shows a further alternative embodiment of a fastening portion of a fastening element, wherein a substantially cylindrical portion is arranged between two conical portions.

FIGS. 19, 20 and 21 provide different embodiments of fastening portions 114 that each have, starting from the connection portion 168, a widening sub-portion 158 and, at the end, a tapering sub-portion 158.

According to FIG. 19, there is provided here a substantially spherical fastening portion 114.

According to FIG. 20, there is provided a widening sub-portion 158 that is at least approximately in the shape of portion of a sphere and which is followed by a circular-cylindrical sub-portion 158. This is in turn followed by a tapering conical sub-portion 158.

According to FIG. 21, a widening conical sub-portion 158 is provided, which follows the connection portion 168. The sub-portion 158 is followed by a circular-cylindrical sub-portion 158. A third sub-portion 158 following that substantially takes the form of a tapering cone.

Figure 22:
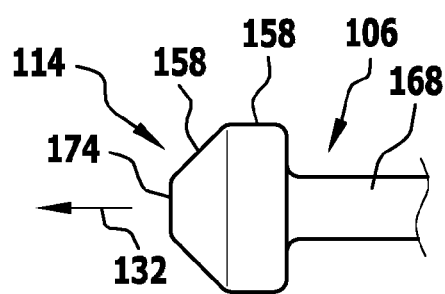
FIG. 22 shows an alternative embodiment of a fastening portion of a fastening element, wherein a conical portion and a cylindrical portion are provided.

According to FIG. 22, a circular-cylindrical sub-portion 158 is provided, which follows the connection portion 168 and is followed by a tapering conical sub-portion 158.

The embodiments that are illustrated in FIGS. 18 to 22 are examples of different variants of fastening portions 114 that may result, depending on the shape of the spring elements 120 of the anchor element 104, in different installation forces and/or retaining forces of the fastening device 100.

FIGS. 23 to 26 illustrate different embodiments of spring elements 120.

Whereas, in the embodiment of the spring elements 120 that is illustrated in FIGS. 1 to 7, the oblique flanks 150 only follow on from a straight portion of the respective spring element 120, in the embodiment illustrated in FIG. 23 both oblique flanks 150 are formed to directly adjoin the sleeve 110 forming the wall 116.

In the embodiments according to FIGS. 23, 25 and 26, in each case the lateral flanks 150 facing the insertion opening 138 are longer than the lateral flanks 150 remote from the insertion opening 138. In all the embodiments, the lateral flank 150 facing the insertion opening 138 takes a substantially straight form. As a result, in particular a uniform force profile may be ensured when the fastening portion 114 is inserted into the receiving space 112 of the anchor element 104.

The lateral flanks 150 that are remote form the insertion opening 138 in this case take for example a curved form (see FIG. 23). Further, a straight configuration may be provided in a direction running obliquely in relation to the direction of connection 132 (see FIG. 24), in which case it may also be provided for the two lateral flanks 150 to have at least approximately the same length.

The lateral flank 150 that is remote from the insertion opening 138 may moreover be formed at least approximately perpendicular to the direction of connection 132 (see FIGS. 25 and 26). As a result of a configuration of this kind of the respective fastening portion 114, it is possible in particular to fix the fastening element 106 non-detachably in relation to the anchor element 104.

Depending on the configuration of the fastening portion 114, in this case a straight lateral flank 150 that is remote from the insertion opening 138 (see FIG. 25) or an arched or undulating configuration (see FIG. 26) may be advantageous.

Otherwise, the variants of spring elements 120 that are illustrated in FIGS. 23 to 26 correspond, as regards their structure and functioning, to the spring elements 120 according to FIGS. 1 to 7, so in this respect reference is made to the description thereof above.

Figure 27:
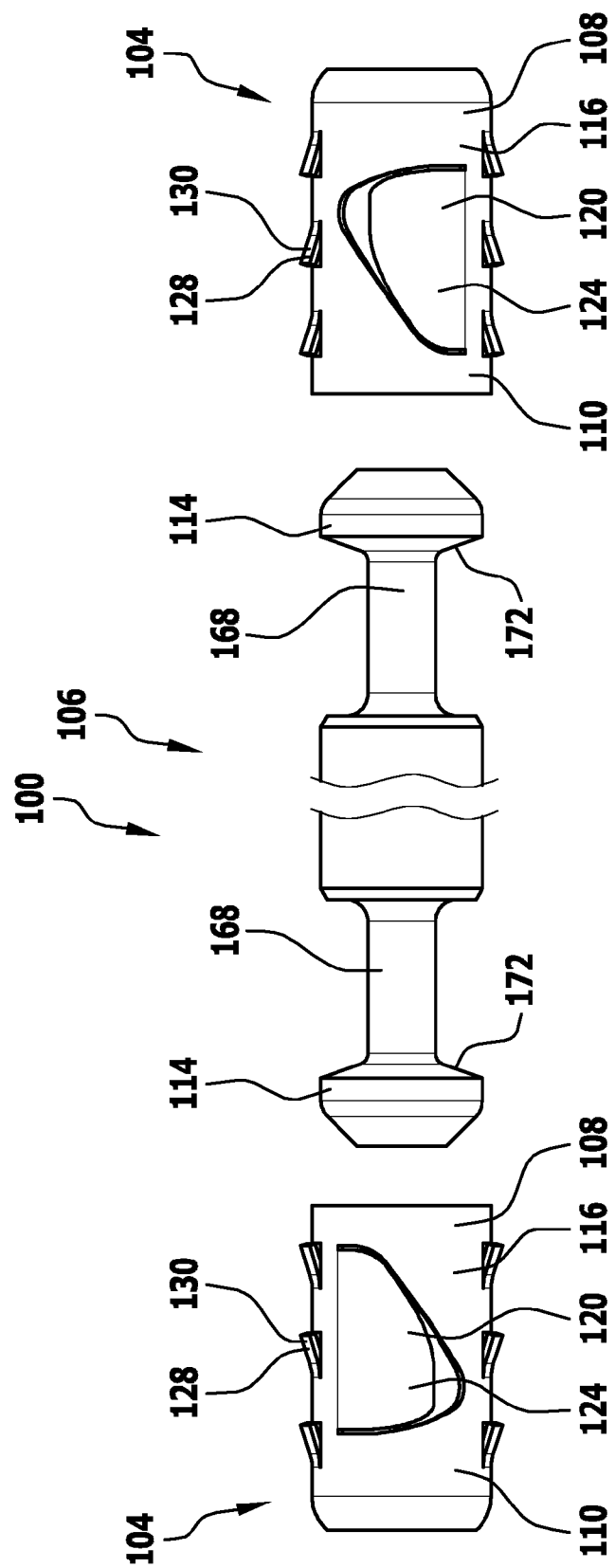
FIG. 27 shows a schematic side view of a fastening device, in which two anchor elements and a fastening element provided with two fastening portions are provided.

An alternative embodiment of a fastening device 100, illustrated in FIG. 27, differs from the embodiment illustrated in FIGS. 1 to 13 substantially in that the fastening element 106 is provided with fastening portions 114 on both sides and is thus engageable on both sides with a respective anchor element 104.

In order to connect two articles 102, two anchor elements 104 are thus required, in each case one anchor element 104 being fixed in a bore 164 in the respective article 102.

The connection between the two anchor elements 104 and thus between the two articles 102 is then made by means of the fastening element 106 in that a respective fastening portion 114 is inserted into a respective anchor element 104 and is fixed therein.

Otherwise, the embodiment of the fastening device 100 that is illustrated in FIG. 27 corresponds, as regards its structure and functioning, to the embodiment illustrated in FIGS. 1 to 13, so in this respect reference is made to the description thereof above.

Figure 28:
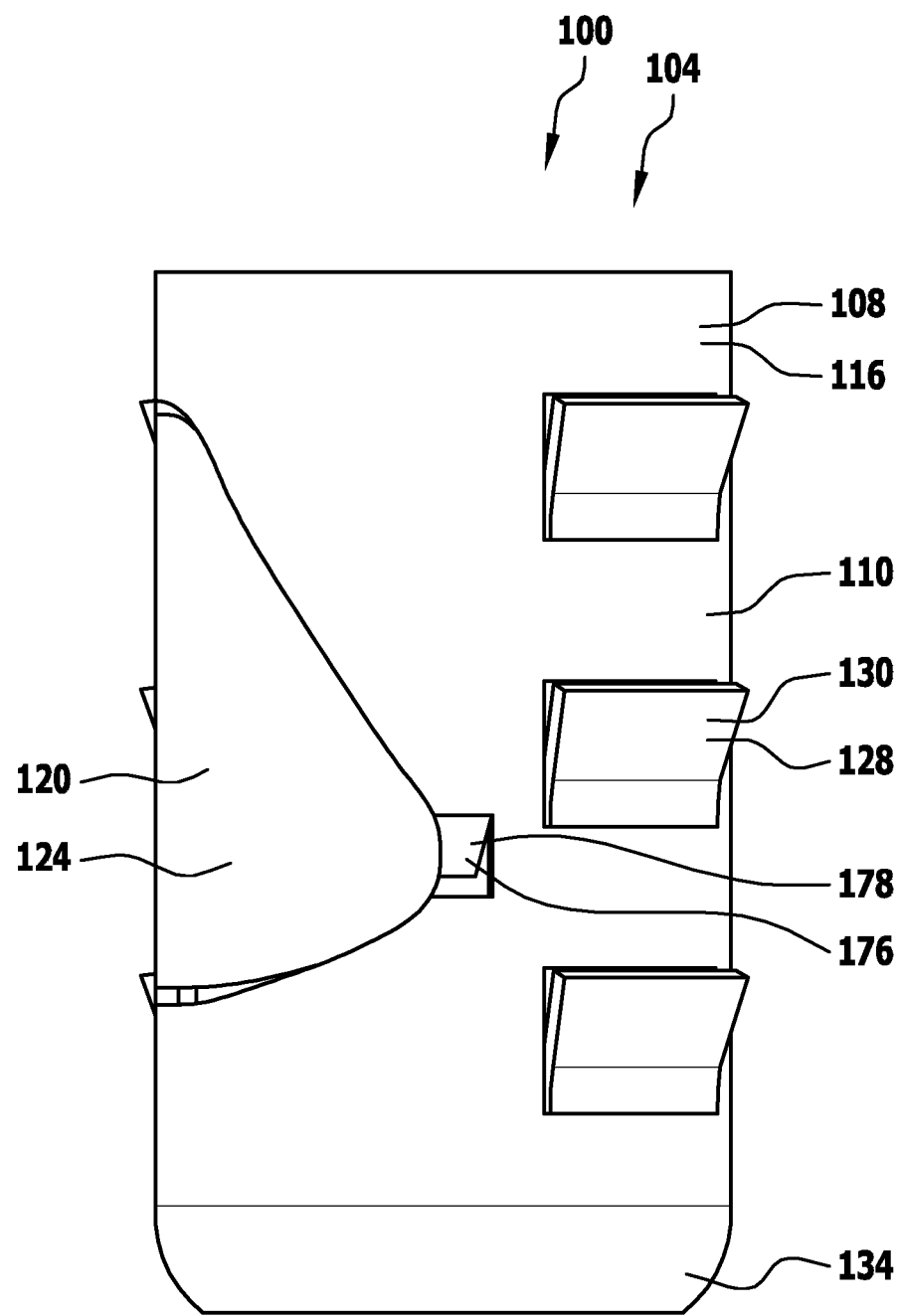
FIG. 28 shows an alternative embodiment of an anchor element, wherein one or more locking elements are provided for locking one or more spring elements in a pre-stressed position.
Figure 29:
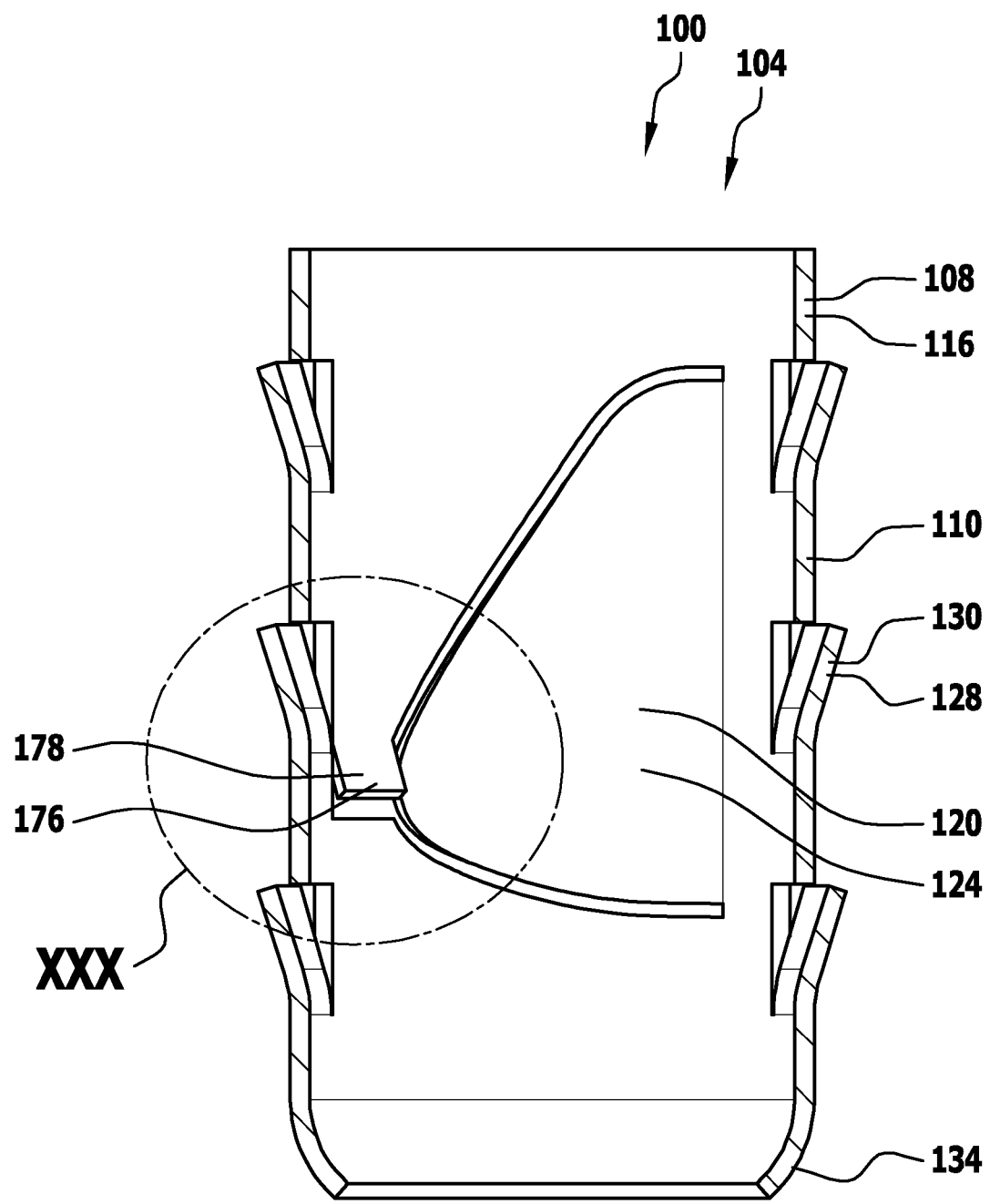
FIG. 29 shows a schematic longitudinal section through the anchor element from FIG. 28.
Figure 30:
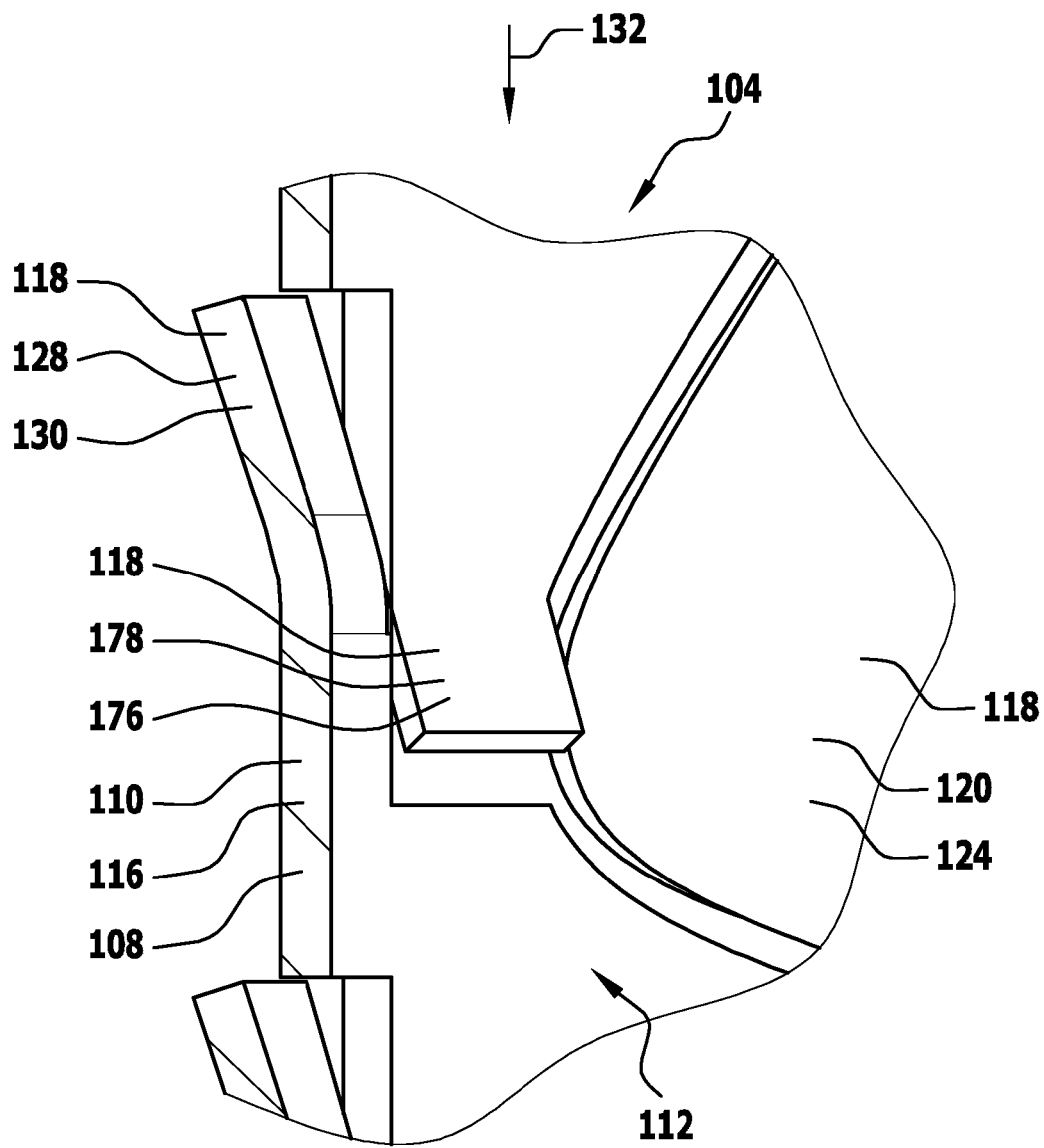
FIG. 30 shows an enlarged illustration of the region XXX in FIG. 29.

An alternative embodiment of an anchor element 104, illustrated in FIGS. 28 to 30, differs from the embodiment illustrated in FIGS. 1 to 7 substantially in that the anchor element 104 includes a locking element 176.

In particular, a spring element 120 is lockable in a pre-stressed position by means of the locking element 176.

Here, the locking element 176 may take the form of a ratchet 178 that is insertable into a path of movement of the spring element 120.

The locking element 176 is preferably formed by a wall portion 118 of the base body 108.

In particular, the locking element 176 is formed in one piece with the base body 108, the spring elements 120 and the anchoring elements 128.

The locking element 176 is preferably movable from a locking position, illustrated in FIGS. 28 to 30, into a release position (not illustrated).

In the locking position, the locking element 176 preferably projects into the receiving space 112 of the anchor element 104. In particular, in so doing the locking element 176 blocks a movement of the spring element 120 that is directed into the receiving space 112 once the spring element 120 is moved outwards from the rest position illustrated in FIGS. 1 to 6, in particular into a pre-stressed position (pre-stressed condition) in which the spring element 120 forms a constituent part of the wall 116 and/or the sleeve 110.

As can be seen in particular from FIGS. 29 and 30, the locking element 176 preferably projects into the receiving space 112 of the anchor element 104 such that the locking element 176 is actuable when a connection portion 114 of a fastening element 106 is inserted.

In particular, the locking element 176 is movable from the locking position, illustrated in FIGS. 28 to 30, into a release position, preferably by means of the fastening portion 114 of a fastening element 106. In particular, in this case the locking element 176 is removable from the receiving space 112. This preferably releases the spring element 120, with the result that it can spring back into the rest position illustrated in FIGS. 1 to 6 and grasp in particular a fastening portion 114 of a fastening element 106.

The anchor element 104 may in this case have one or more locking elements 176.

In particular, one or more locking elements 176 may be provided for one or more spring elements 120.

Otherwise, the embodiment of an anchor element 104 that is illustrated in FIGS. 28 to 30 corresponds, as regards its structure and functioning, to the embodiment illustrated in FIGS. 1 to 7, so in this respect reference is made to the description thereof above.

Figure 31:
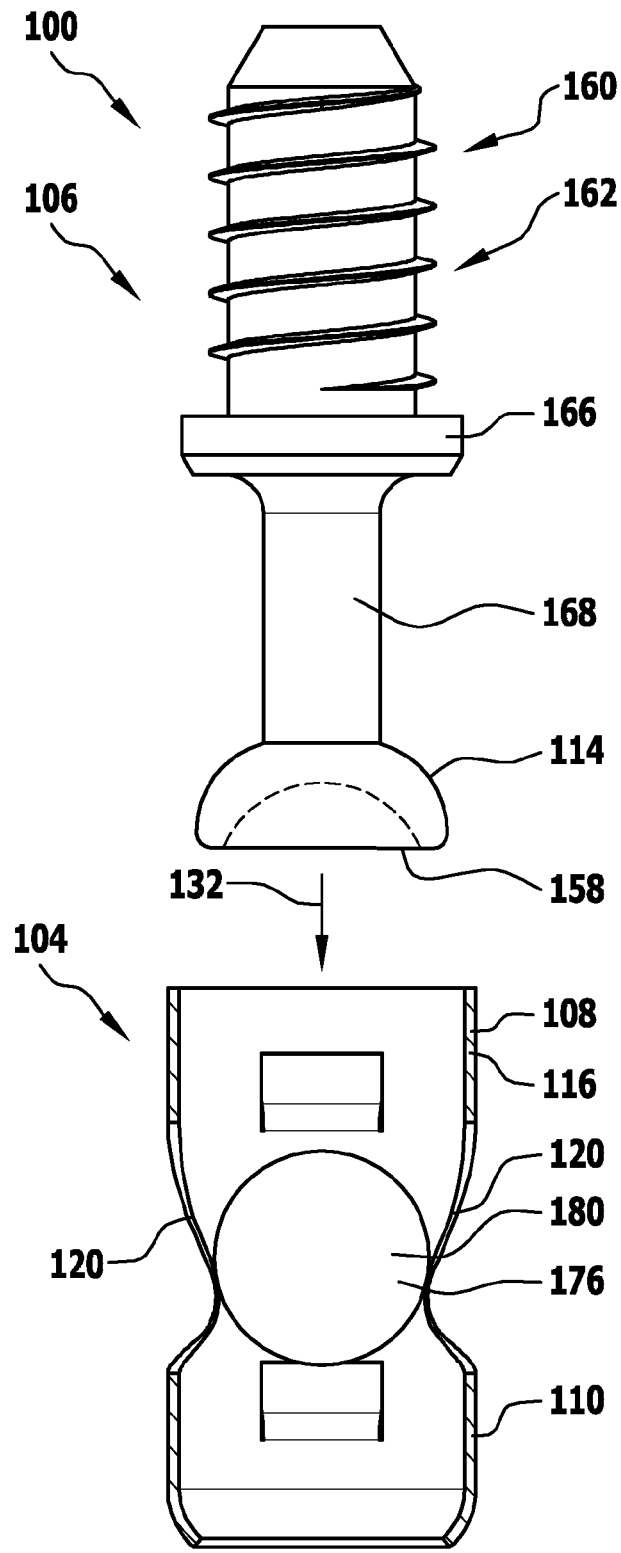
FIG. 31 shows an alternative embodiment of a fastening device, in which a locking element that is clamped between two spring elements is provided, for locking the spring elements in a pre-stressed position.

An alternative embodiment of a fastening device 100, illustrated in FIG. 31, differs from the embodiment illustrated in FIGS. 1 to 13 substantially in that, in a manner similar to the embodiment of an anchor element 104 illustrated in FIGS. 28 to 30, a locking element 176 is provided for holding one or more spring elements 120 in a pre-stressed position.

In this case, the locking element 176 is not a constituent part of the base body 108 of the anchor element 104, however, but an additional component.

The locking element 172 for example takes the form of a locking ball 180 and is arranged in the receiving space 112 of the anchor element 104.

A fastening portion 114 of the fastening element 106 preferably has a sub-portion 158 that takes, at least in certain regions, a form that is complementary with the locking ball 180.

As a result, the fastening portion 114 of the fastening element 106 is engageable with the locking ball 180 in a simple manner in order to move the locking ball 180 in the direction of connection 132 and thus to release the pre-stressed spring elements 120.

Otherwise, the embodiment of a fastening device 100 that is illustrated in FIG. 31 corresponds, as regards its structure and functioning, to the embodiment illustrated in FIGS. 1 to 13, so in this respect reference is made to the description thereof above.

Figure 32:
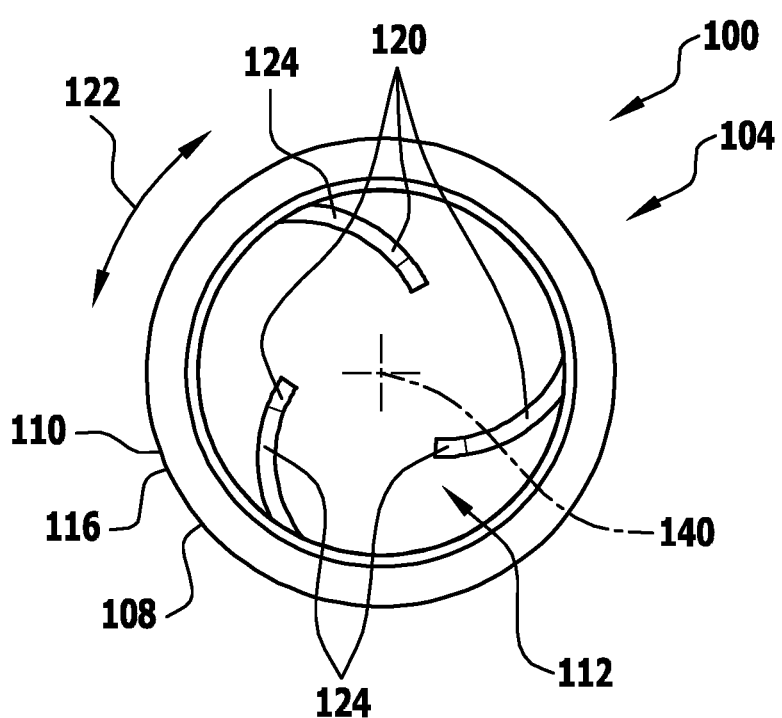
FIG. 32 shows an alternative embodiment of an anchor element, in which three spring elements are provided.

An alternative embodiment of an anchor element 104, illustrated in FIG. 32, differs from the embodiment illustrated in FIGS. 1 to 7 substantially in that the anchor element 104 includes three spring elements 120.

In further embodiments of anchor elements 104, it is further also possible for only individual spring elements 120 or for four, five or more than five spring elements 120 to be provided.

Otherwise, the embodiment of an anchor element 104 that is illustrated in FIG. 32 corresponds, as regards its structure and functioning, to the embodiment illustrated in FIGS. 1 to 7, so in this respect reference is made to the description thereof above.

Figure 33:
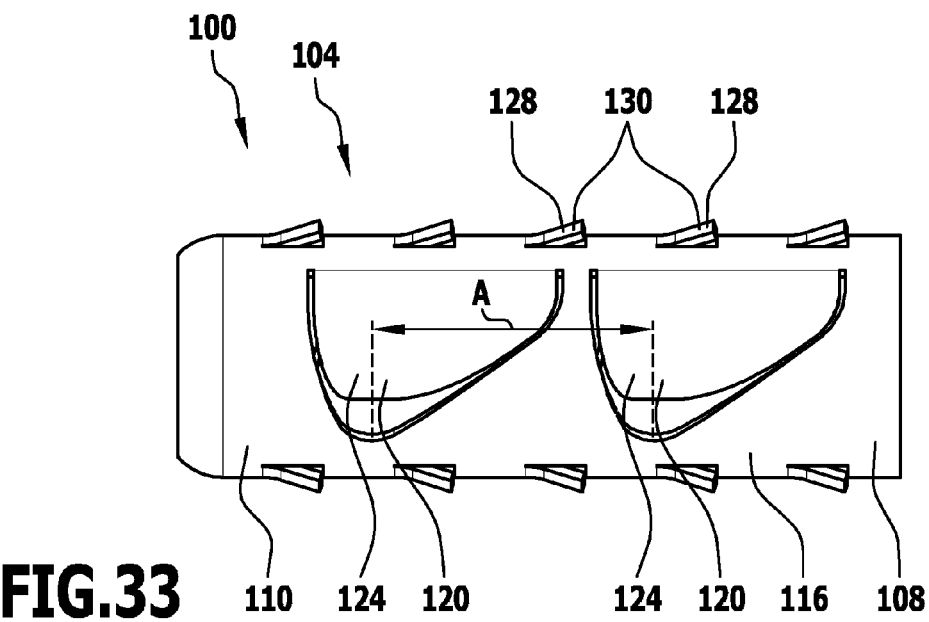
FIG. 33 shows a further alternative embodiment of an anchor element which includes at least two spring elements that are arranged one behind the other in relation to a direction of connection.
Figure 34:
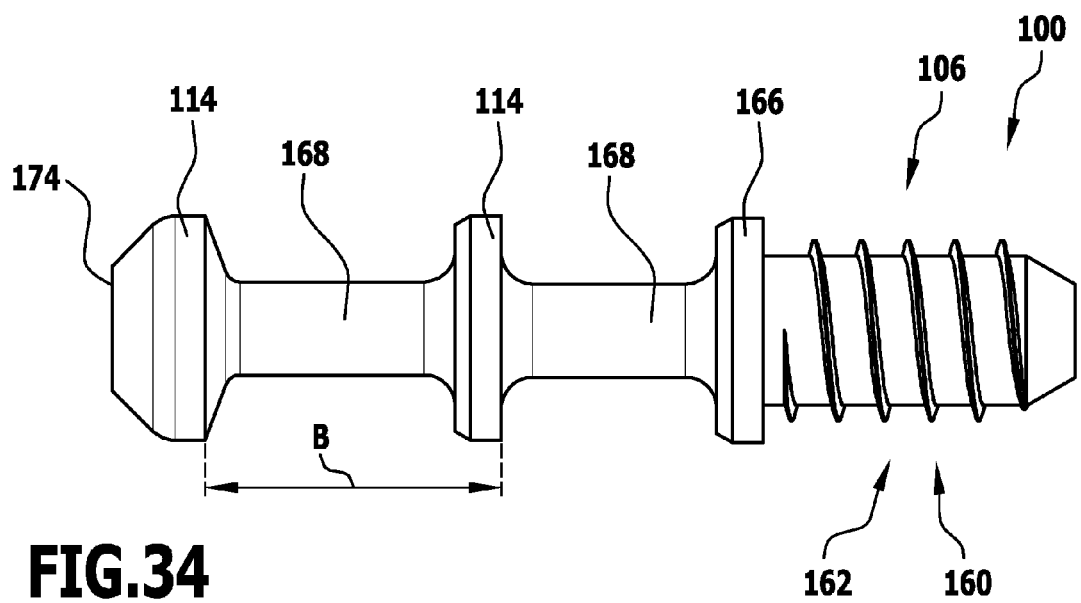
FIG. 34 shows a schematic side view of an alternative embodiment of a fastening element which includes a plurality of fastening portions arranged one behind the other in a direction of connection.
Figure 35:
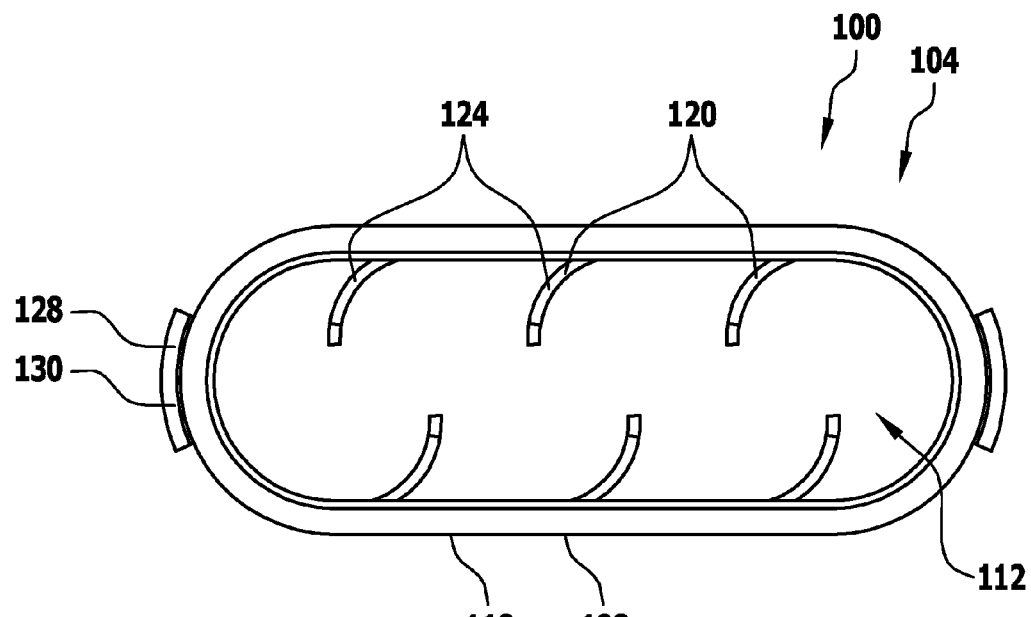
FIG. 35 shows a schematic plan view of an alternative embodiment of an anchor element which has an elongate cross section and is provided with six spring elements.
Figure 36:
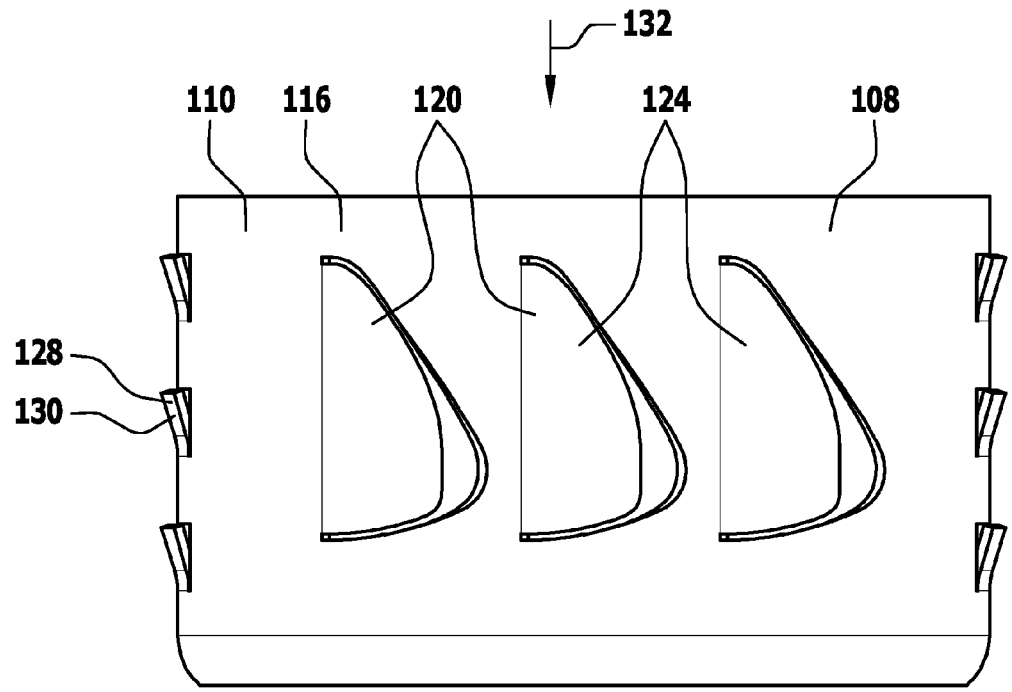
FIG. 36 shows a schematic side view of the anchor element from FIG. 35.

An alternative embodiment of a fastening device 100, illustrated in FIGS. 33 and 34, differs from the embodiment illustrated in FIGS. 1 to 13 substantially in that the anchor element 104 includes a plurality of spring elements 120 that are arranged one behind the other in the direction of connection 132.

Moreover, the fastening element 106 includes, preferably, a plurality of fastening portions 114 that are arranged one behind the other in the direction of connection 132.

By using a plurality of the spring elements 120 arranged one behind the other in the direction of connection 132, it is possible to fix a fastening element 106 in different positions in relation to the anchor element 104.

Further, it is preferably possible to fix the fastening element 106 in different positions in relation to the anchor element 104 in that the fastening element has a plurality of fastening portions 114 arranged one behind the other in the direction of connection 132.

It may be favourable if a spacing A taken in the direction of connection 132 between two spring elements 120 that are arranged one behind the other differs from a spacing B taken in the direction of connection 132 between two fastening portions 114 arranged one behind the other. As a result, in particular a closely graduated latching of the fastening element 106 to the anchor element 104 may be achieved.

Otherwise, the embodiment of a fastening device 100 that is illustrated in FIGS. 33 and 34 corresponds, as regards its structure and functioning, to the embodiment illustrated in FIGS. 1 to 13, so in this respect reference is made to the description thereof above.

An embodiment of a fastening device 100, illustrated in FIGS. 35 to 38, differs from the embodiment illustrated in FIGS. 1 to 13 substantially in that both the anchor element 104 and the fastening element 106 have an elongate cross section in the direction perpendicular to the direction of connection 132.

This makes it possible for example to make a connection between two articles 102 that cannot rotate in relation to the direction of connection 132.

Figure 37:
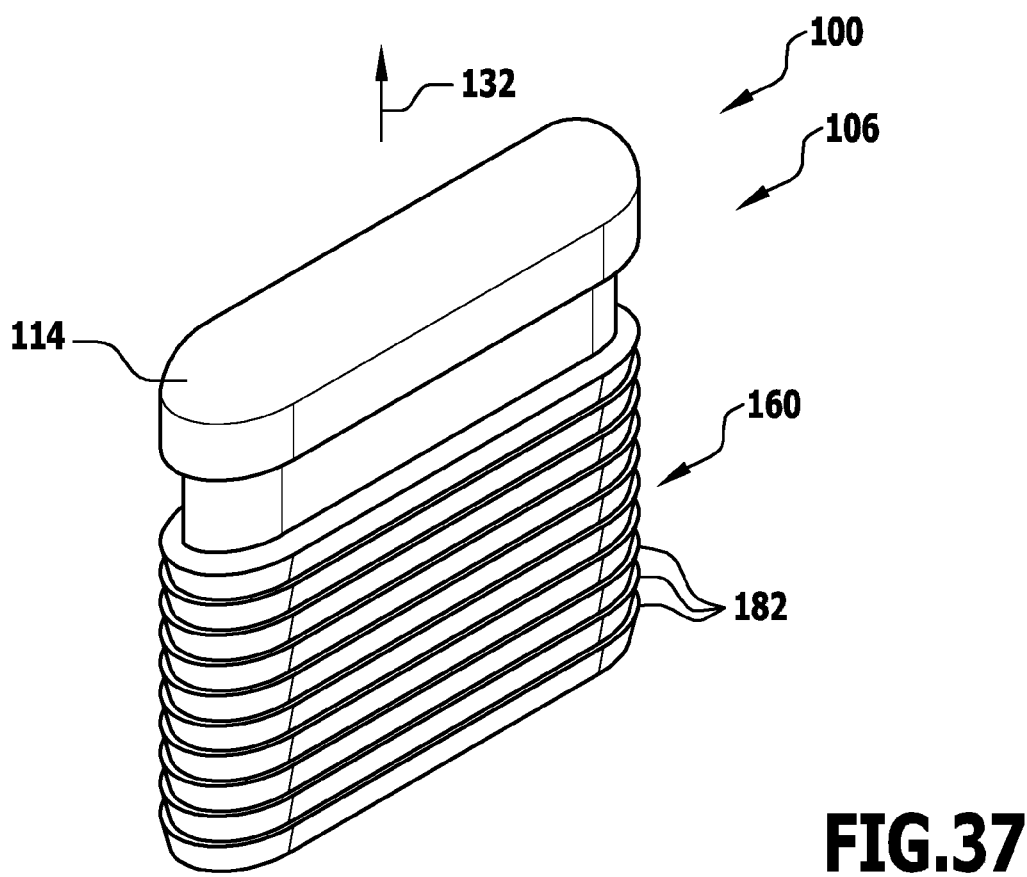
FIG. 37 shows a schematic perspective illustration of a fastening element for fixing in the anchor element according to FIG. 35.
Figure 38:
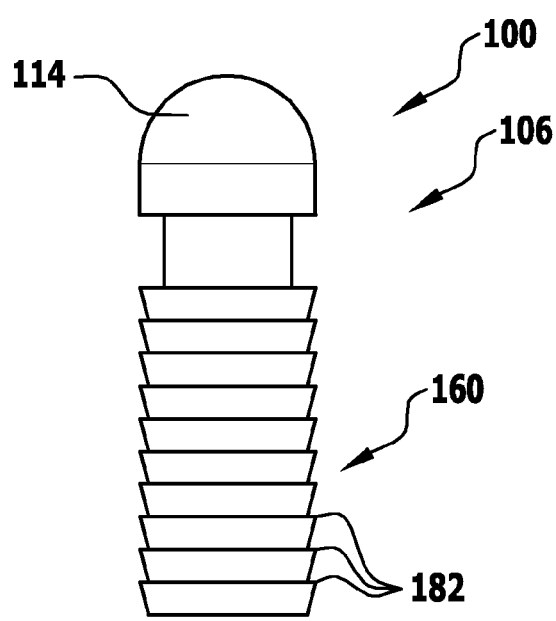
FIG. 38 shows a schematic plan view of a short side of the fastening element from FIG. 37.

As can be seen in particular from FIGS. 37 and 38, in the case of a fastening element 106 it is possible also to provide, in particular instead of a screw portion 162, an anchoring portion 160 that is provided with a fluting 182 or with other grooves or lateral bulges, for the purpose of anchoring the fastening element 106 in an article 102.

A configuration of this kind for an anchoring portion 160 is in particular independent of a cross sectional shape of the fastening element 106 and/or anchor element 104.

Otherwise, the embodiment of a fastening device 100 that is illustrated in FIGS. 35 to 38 corresponds, as regards its structure and functioning, to the embodiment illustrated in FIGS. 1 to 13, so in this respect reference is made to the description thereof above.

Figure 39:
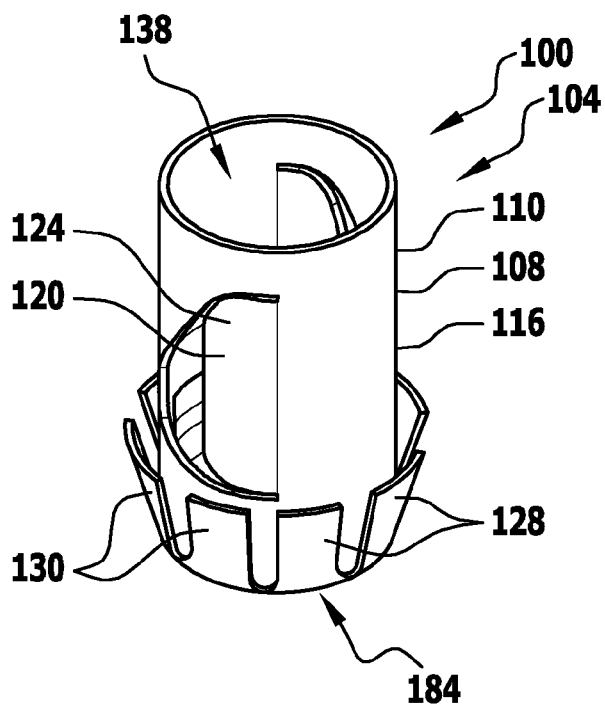
FIG. 39 shows a schematic perspective illustration of an alternative embodiment of an anchor element which includes a plurality of anchoring portions that are formed by bending a portion of the anchor element outwards in the manner of a collar, such that a substantially annular anchoring region is formed.
Figure 40:
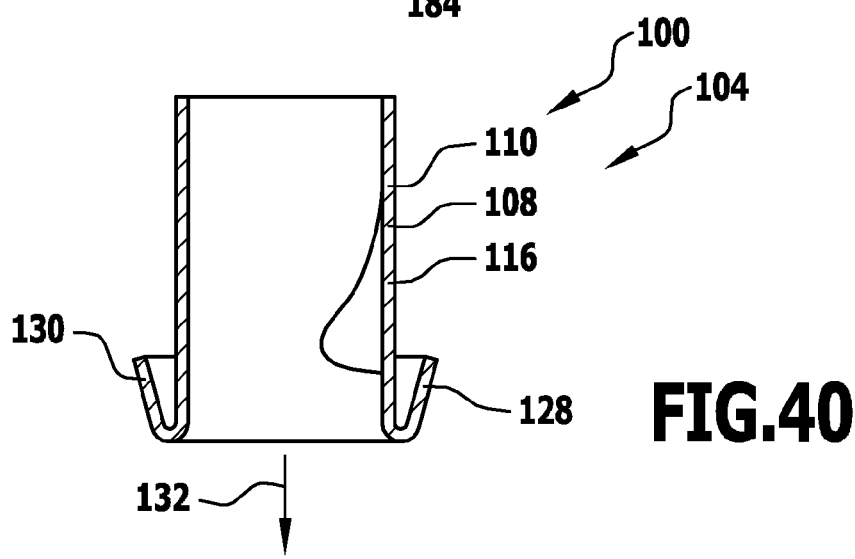
FIG. 40 shows a schematic longitudinal section through the anchor element from FIG. 39.
Figure 41:
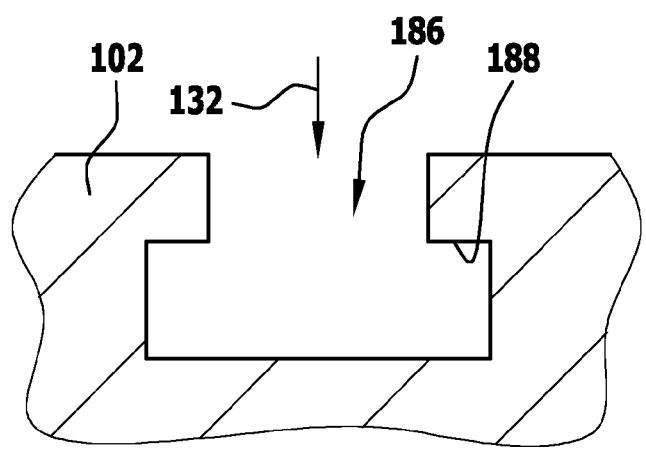
FIG. 41 shows a groove made in an article, for receiving the anchor element from FIG. 39.

An alternative embodiment of an anchor element 104, illustrated in FIGS. 39 to 41, differs from the embodiment illustrated in FIGS. 1 to 7 substantially in that an end 184 of the sleeve 110 remote from the insertion opening 138 is bent around outwards or flanged in a ring shape. Moreover, slots that preferably run in the direction of connection 132 are provided in this bent-around or flanged part of the sleeve 110, with the result that a plurality of anchoring elements 128 of the anchor element 104, which act as barbs 130, are formed.

In this case, the anchoring elements 128 are in particular arranged in the form of a ring.

An anchor element 104 of this kind is in particular fixable in a groove 186 in an article 102, wherein the groove 186 has an undercut portion 188 in relation to the direction of connection 132.

A groove 186 of this kind is for example producible by means of a T-shaped milling cutter, in particular by boring and circular milling.

Otherwise, the embodiment of an anchor element 104 that is illustrated in FIGS. 39 to 41 corresponds, as regards its structure and functioning, to the embodiment illustrated in FIGS. 1 to 7, so in this respect reference is made to the description thereof above.

Figure 42:
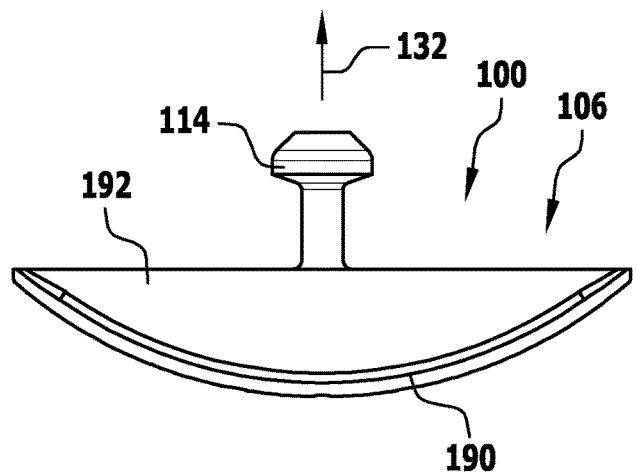
FIG. 42 shows an alternative embodiment of a fastening element, which includes an anchoring portion that includes one or more undercut portions in the shape of a circular arc portion, and that is engageable in a groove, of a shape complementary therewith, in an article.
Figure 43:
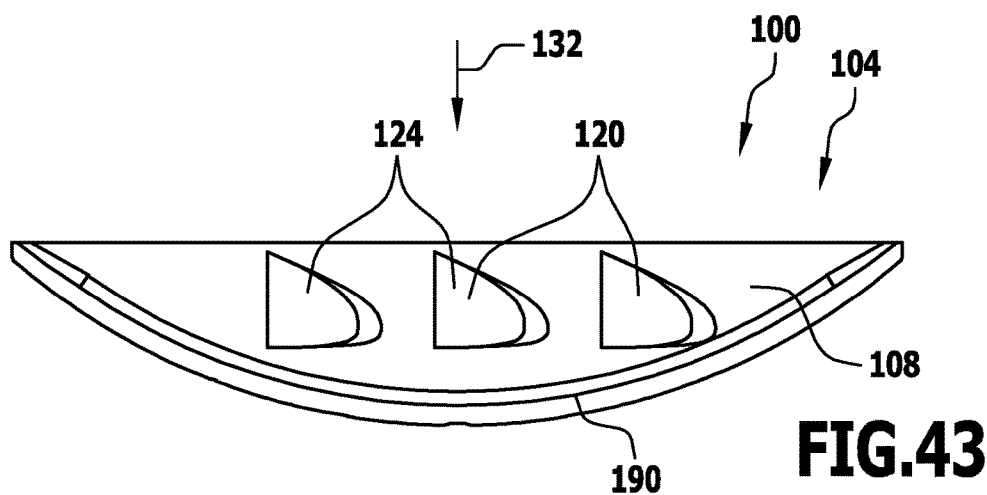
FIG. 43 shows an alternative embodiment of an anchor element which includes one or more undercut portions in the shape of a circular arc portion and which is engageable in a groove, of a shape complementary therewith, in an article.
Figure 44:
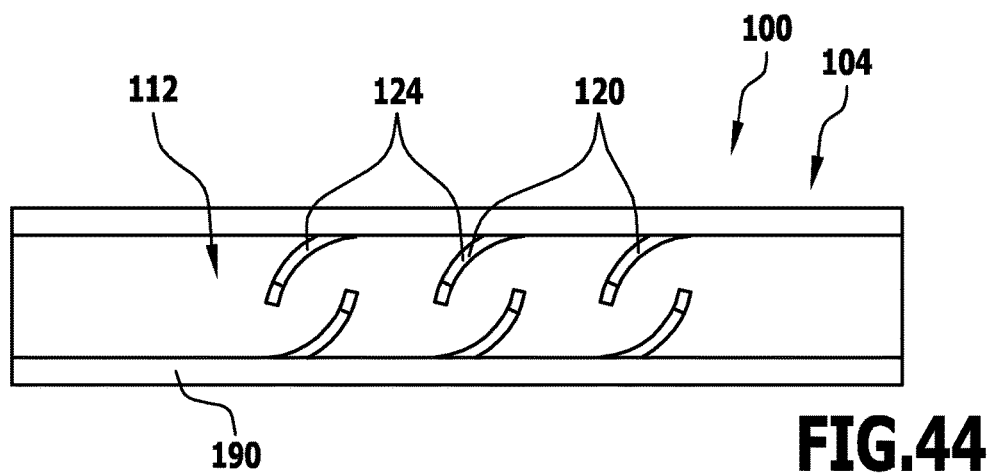
FIG. 44 shows a schematic plan view of the anchor element from FIG. 43.

FIGS. 42 to 44 illustrate an alternative embodiment of an anchoring portion 160 of a fastening element 106 (see FIG. 42) and an alternative embodiment of anchoring elements 128 of an anchor element 104 (see FIGS. 43 and 44) respectively.

Here, for the purpose of anchoring the fastening element 106 and the anchor element 104, non-self-tapping anchoring projections 190 that are in the shape of a circular arc portion are provided.

Here, in each case the anchoring projections 190 project substantially perpendicular to the direction of connection 132, laterally away from a base body 108 of the anchor element 104 and a base body 192 of the fastening element 106 respectively.

By means of the anchoring projections 190, the fastening element 106 and the anchor element 104 are in particular engageable in grooves (not illustrated) in the articles 102, which have undercut portions formed to be substantially complementary with the anchoring projections 190.

The exact shape of the base bodies 108 and 192 and of the anchoring projections 190 arranged thereon, for anchoring in the articles 102, is described in particular in EP 1 990 549 A1, to which reference is explicitly made here and whereof the content is hereby incorporated into this description by reference.

The embodiment of a fastening element 106 that is illustrated in FIG. 42 is for example engageable with an anchor element 104 according to FIGS. 1 to 7.

The embodiment of an anchor element 104 that is illustrated in FIGS. 43 and 44 enables for example a fastening element 106 according to FIGS. 37 and 38 to be received.

Otherwise, as regards the structure and functioning of the fastening element 106 from FIG. 42 and the anchor element 104 according to FIGS. 43 and 44, reference is thus made to the description relating to the said further embodiments.

An alternative embodiment of an anchor element 104, illustrated in FIG. 45, differs from the embodiment illustrated in FIGS. 1 to 7 substantially in that the fastening opening 136 has a smaller cross section.

Here, the fastening opening 136 makes it possible to pass through a screw part 194 of a screw 196.

A screw head 198 of the screw 196 is preferably made larger than the fastening opening 136, however, with the result that it cannot be moved through the fastening opening 136 in the direction of connection 132.

Using the screw 196, it is thus possible to screw the anchor element 104 to an article 102.

Otherwise, the embodiment of an anchor element 104 that is illustrated in FIG. 45 corresponds, as regards its structure and functioning, to the embodiment illustrated in FIGS. 1 to 7, so in this respect reference is made to the description thereof above.

Figure 46:
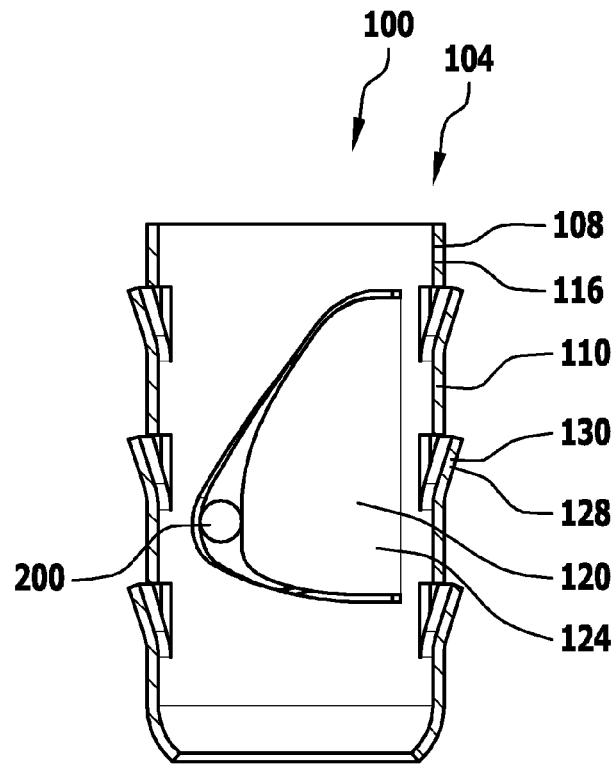
FIG. 46 shows a schematic longitudinal section through an alternative embodiment of an anchor element in which a fluid receptacle is provided for receiving for example adhesive.

An alternative embodiment of an anchor element 104, illustrated in FIG. 46, differs from the embodiment illustrated in FIGS. 1 to 7 substantially in that the anchor element 104 includes one or more fluid receptacles 200.

A fluid receptacle 200 serves in particular to receive a fluid, for example adhesive.

The fluid receptacle 200 is in particular arranged in a region of the anchor element 104 which, when a fastening portion 114 of the fastening element 106 is inserted, is moved into the receiving space 112 or captured by the fastening portion 114.

The fluid receptacle 200 is preferably damageable as a result of the fastening portion 114 being inserted into the receiving space 112 of the anchor element 104, with the result that the fluid therein can emerge. In particular, as a result it may be made possible, when the fastening portion 114 is fixed in the receiving space 112 of the anchor element 104, for adhesive to be released at the same time, and this adhesive enables an additional connection, in particular a substance-to-substance bond, to be made between the anchor element 104, the fastening element 106 and/or one or more articles 102.

Otherwise, the embodiment of an anchor element 104 that is illustrated in FIG. 46 corresponds, as regards its structure and functioning, to the embodiment illustrated in FIGS. 1 to 7, so in this respect reference is made to the description thereof above.

Figure 47:
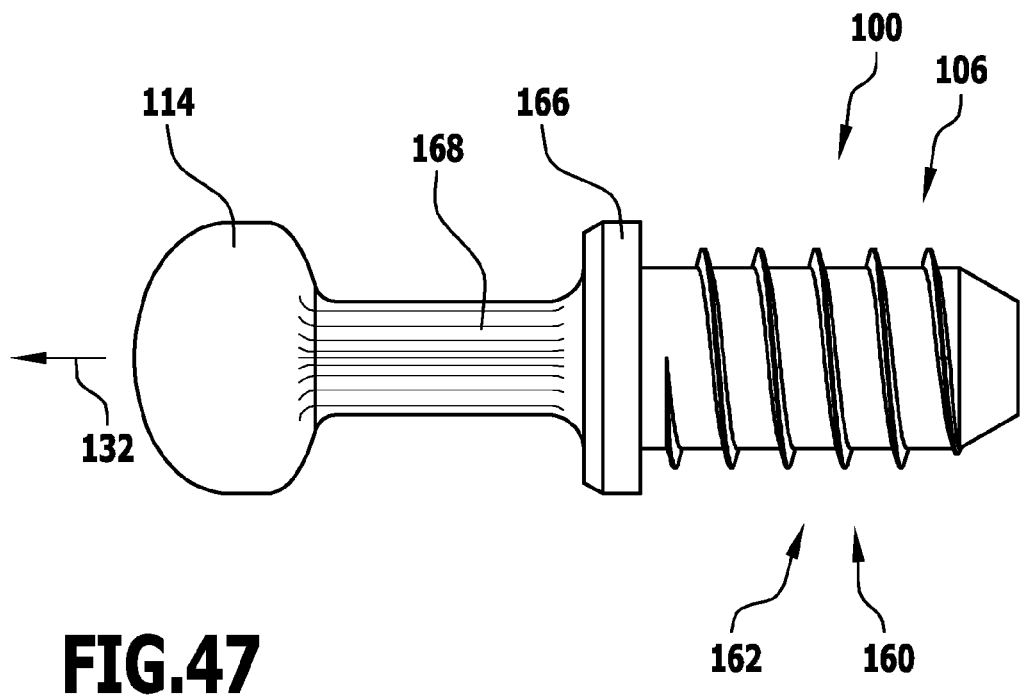
FIG. 47 shows a schematic side view of an alternative embodiment of a fastening element which is knurled in a connection portion and as a result is engageable with one or more spring elements of an anchor element such that it cannot rotate therewith and/or such that it is latched.
Figure 48:
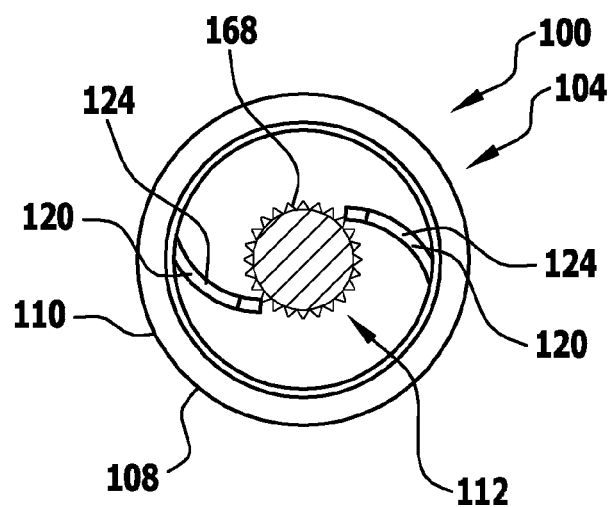
FIG. 48 shows a schematic section through an anchor element and the fastening element from FIG. 47, to illustrate the interaction between the spring elements and the connection portion of the fastening element from FIG. 47.

An embodiment of a fastening device 100, illustrated in FIGS. 47 and 48, differs from the embodiment illustrated in FIGS. 1 to 13 substantially in that the connection portion 168 of the fastening element 106 takes a contoured form.

For example, the connection portion 168 may be provided with a knurling.

In particular, grooves are provided, running in the direction of connection 132.

Since the connection portion 168 is preferably in contact with the ends 154 of the spring elements 120 in the installed condition of the fastening device 100, the contoured form of the connection portion 168 may preferably have the effect of transmitting force from the ends 154 of the spring elements 120 to the fastening element 106 or vice versa. This force transmission may for example be used to transmit a rotary movement from the fastening element 106 to the anchor element 104. Further, the transmission of force may serve to fix the fastening element 106 in a manner preventing rotation in relation to the anchor element 104.

As can be seen in particular from FIG. 48, the spring elements 120 preferably project in a spiral shape into the receiving space 112. As a result, depending on the formation of the contoured connection portion 168 and/or the ends 154 of the spring elements 120, it may further be made possible for the fastening element 106 to be rotatable in relation to the anchor element 104 in one direction of rotation about the direction of connection 132, while rotation in the opposite direction of rotation is blockable by means of the spring elements 120.

Otherwise, the embodiment of a fastening device 100 that is illustrated in FIGS. 47 and 48 corresponds, as regards its structure and functioning, to the embodiment illustrated in FIGS. 1 to 13, so in this respect reference is made to the description thereof above.

Figure 49:
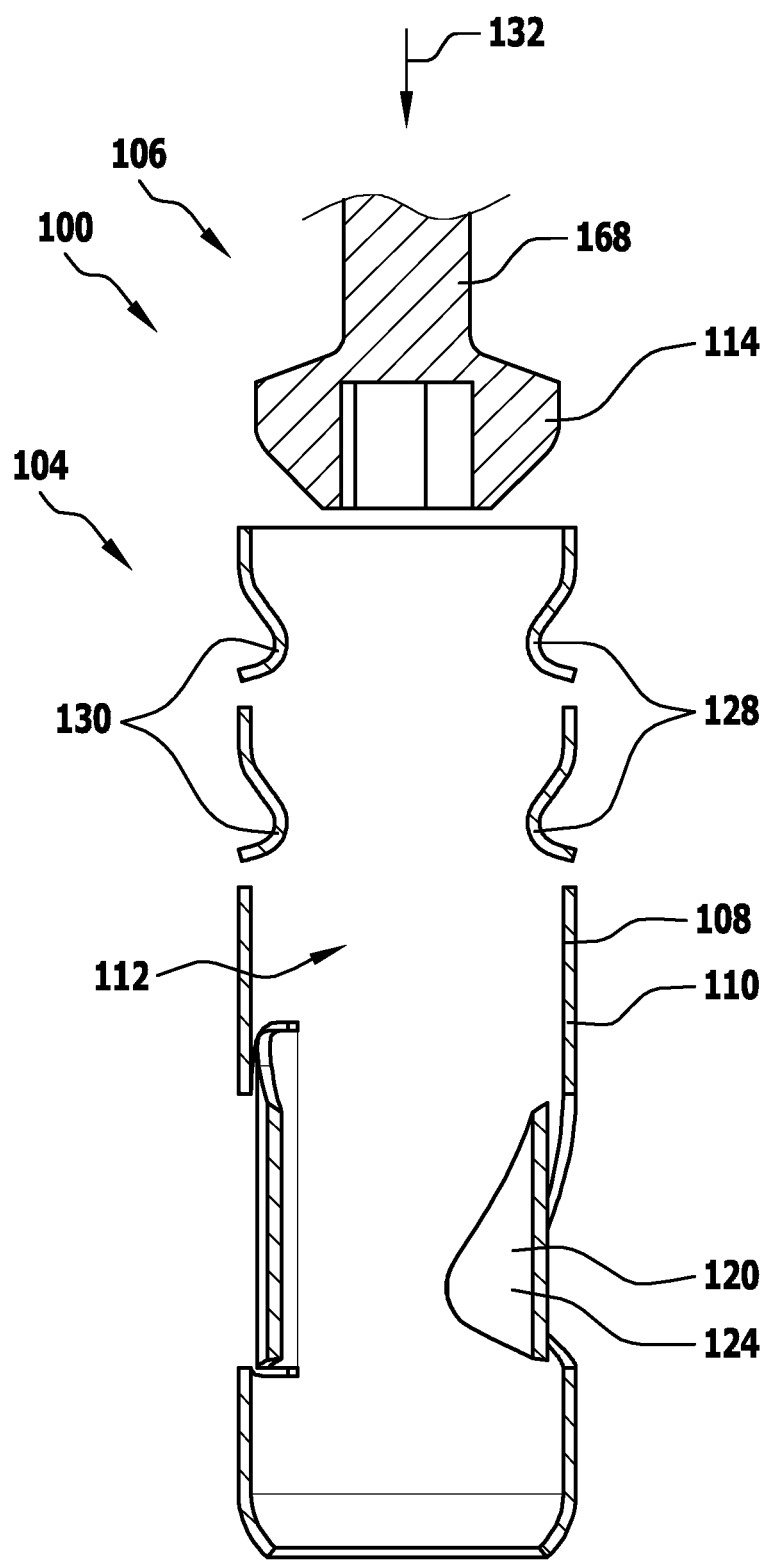
FIG. 49 shows an alternative embodiment of an anchor element, wherein a plurality of anchoring elements are provided which, in a condition prepared for installation of the anchor element, at least in certain regions project into the interior (receiving space) of the anchor element and are plastically deformable for the purpose of anchoring the anchor element.
Figure 50:
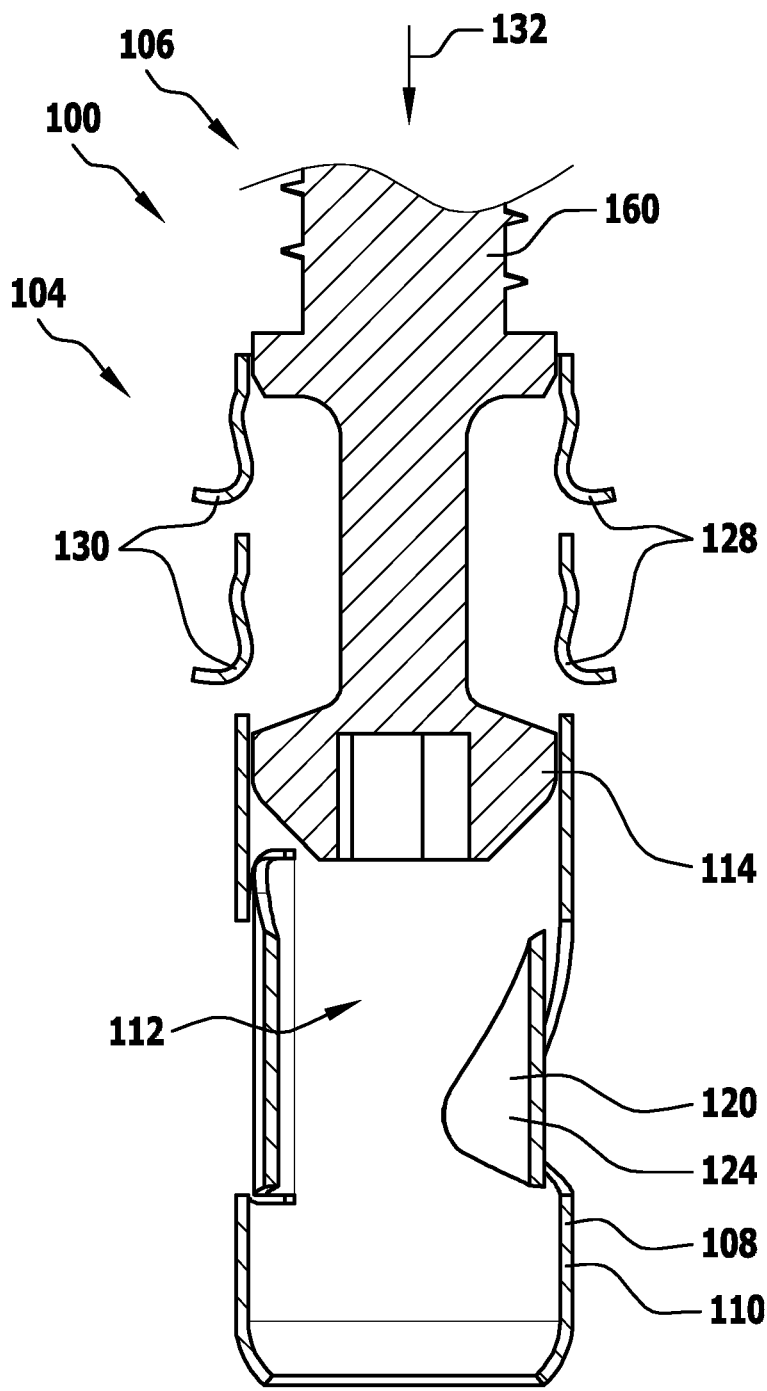
FIG. 50 shows an illustration of the anchor element, corresponding to FIG. 49, wherein the anchoring elements have been actuated by means of a fastening element and moved into an anchoring position.

An alternative embodiment of a fastening device 100, illustrated in FIGS. 49 and 50, differs from the embodiment illustrated in FIGS. 1 to 13 substantially in that the anchor element 104 has a plurality of anchoring elements 128, which in a condition prepared for installation of the fastening device 100 project at least in certain regions into the receiving space 112 of the anchor element 104 (see FIG. 49). In particular, in this condition prepared for installation, preferably the anchoring elements 128 do not project outwards beyond the sleeve 110 of the anchor element 104.

As a result of suitable shaping of the anchoring elements 128, they are actuable, preferably by means of the fastening portion 114 of a fastening element 106, when the fastening portion 114 is inserted into the receiving space 112 of the anchor element 104.

Here, the anchoring elements 128 are preferably movable out of the initial position illustrated in FIG. 49 and into the anchoring position illustrated in FIG. 50.

In this case, the anchoring elements 128 are preferably plastically reshaped such that, after the anchoring elements 128 have been deformed by means of the fastening portion 114, they remain in the anchoring position illustrated in FIG. 50 and thus fix the anchor element 104 in an article 102.

Otherwise, the embodiment of a fastening device 100 that is illustrated in FIGS. 49 and 50 corresponds, as regards its structure and functioning, to the embodiment illustrated in FIGS. 1 to 13, so in this respect reference is made to the description thereof above.

Figure 51:
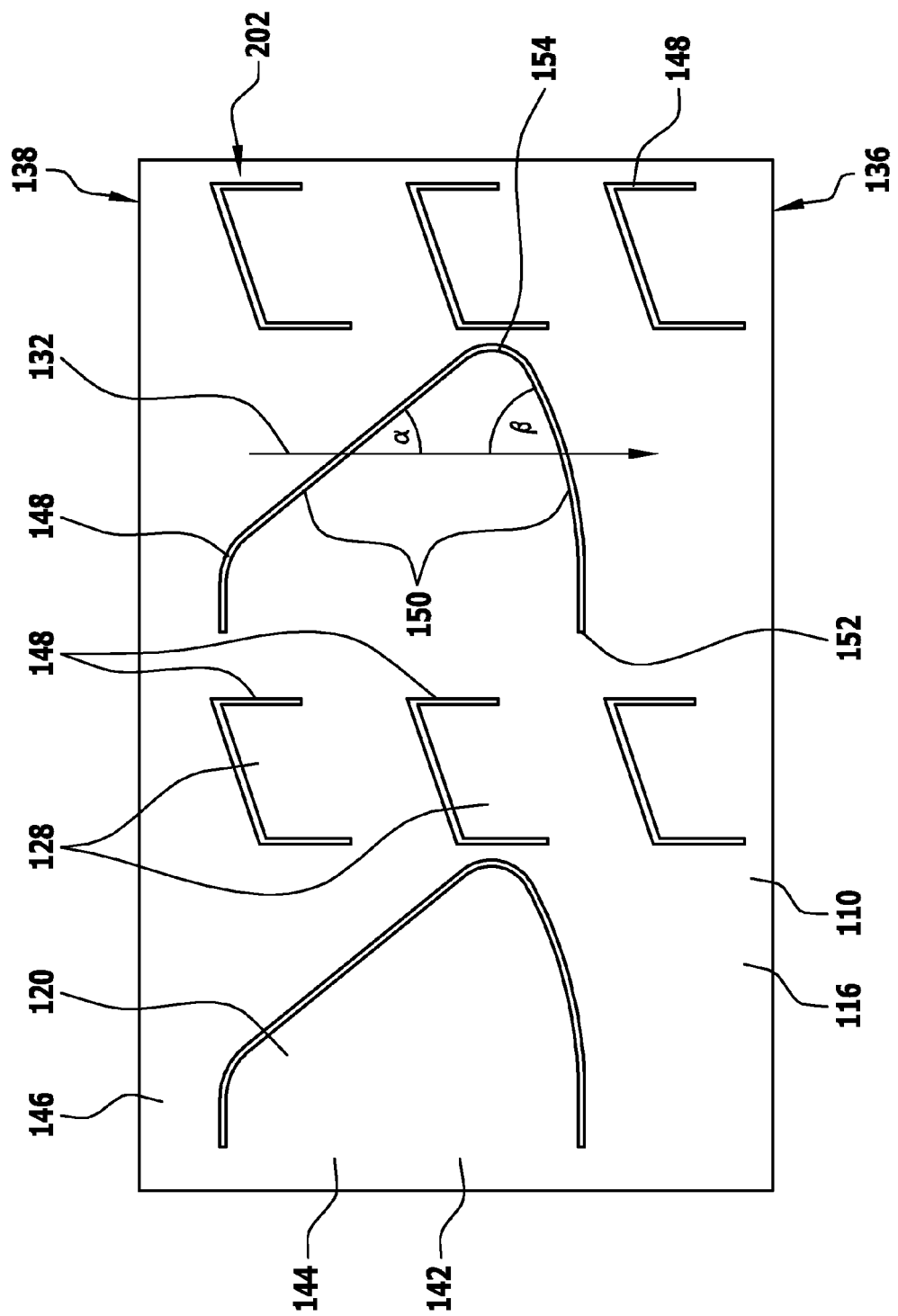
FIG. 51 shows a schematic illustration, corresponding to FIG. 7, of an alternative embodiment of a metal sheet from which an anchor element that has a fragmented external thread formed by anchoring elements is producible.

An alternative embodiment of an anchor element 104, illustrated in FIG. 51, differs from the embodiment illustrated in FIGS. 1 to 7 substantially in that the anchoring elements 128 are oriented obliquely to the direction of connection 132, in particular by a suitable formation of the cuts 148.

By means of the anchoring elements 128, consequently a fragmented external thread 202 of the anchor element 104 is preferably formed.

In particular, and by rotating the anchor element 104 about a longitudinal centre axis 140 thereof that runs parallel to the direction of connection 132, the anchor element 104 may in this case be unscrewed from a bore 164 in an article 102 or screwed into the bore 164 in the article 102.

For example, by combining an anchor element 104 of this kind with a fastening element 106 according to FIG. 47, it may be made possible for an anchor element 104 arranged in an article 102 to be unscrewed from the article 102 by rotation of a fastening element 106 fixed therein.

Otherwise, the embodiment of an anchor element 104 that is illustrated in FIG. 51 corresponds, as regards its structure and functioning, to the embodiment illustrated in FIGS. 1 to 7, so in this respect reference is made to the description thereof above.

In further embodiments (not illustrated) of fastening devices 100, individual or a plurality of features of the embodiments of fastening devices 100 that are described above may be combined with one another as desired. For example, the anchor element 104 according to FIGS. 49 and 50 may be provided with three spring elements 120 according to FIG. 32. Further, a contouring of the connection portion 168 according to FIG. 47 may for example also be provided in the case of the fastening element 106 according to FIG. 34.

LIST OF REFERENCE NUMERALS

100 Fastening device
102 Article
104 Anchor element
106 Fastening element
108 Base body (of anchor element 104)
110 Sleeve
112 Receiving space
114 Fastening portion
116 Wall
118 Wall portion
120 Spring element
122 Peripheral direction
124 Latching spring
126 Tab
128 Anchoring element
130 Barb
132 Direction of connection
134 Introduction ramp
136 Fastening opening
138 Insertion opening
140 Longitudinal centre axis
142 Flat strip material
144 Sheet-metal material
146 Metal sheet
148 Cut
150 Flank
152 Initial region
154 End (of spring element 120)
156 Collar
158 Sub-portion
160 Anchoring portion
162 Screw portion
164 Bore
166 Abutment portion
168 Connection portion
170 Tool receptacle
172 End (facing 160)
174 End (remote from 160)
176 Locking element
178 Ratchet
180 Locking ball
182 Fluting
184 End (remote from 138)
186 Groove
188 Undercut portion
190 Anchoring projection
192 Base body (of fastening element 106)
194 Screw part
196 Screw
198 Screw head
200 Fluid receptacle
202 External thread
α (alpha) Angle
β (beta) Angle
A Spacing
B Spacing

The invention claimed is:

1. An anchor element for fastening an article to a further article, the anchor element comprising:
a base body that takes a hollow form, at least in certain regions, and surrounds a receiving space for receiving a fastening element, wherein
the base body includes one or more elastically yielding spring elements that are formed by one or more wall portions of the base body, and these project into the receiving space in an installed condition of the anchor element,
one or more of said spring elements each have two side wings,
one of the side wings is adjacent to an inlet for introducing a fixing element into said receiving space, and
one other of the side wings is disposed away from the inlet,
wherein said one or more elastically yielding spring elements of the base body each have two lateral flanks, and
wherein the flanks form mutually different angles (α (alpha), β (beta)) with a direction of connection of the anchor element,
wherein the anchor element includes one or more anchoring elements for anchoring the anchor element in an article,
said one or more anchoring elements being formed by wall portions of the base body which, in an installed condition of the anchor element, starting from the sleeve, project outwards away from the receiving space,
wherein in a condition that is ready for installation of the anchor element, said one or more anchoring elements, starting from the sleeve, project at least in certain regions into the receiving space, and
one or more anchoring elements form barbs for anchoring the anchor element in an article.

2. The anchor element according to claim 1, wherein
the base body takes an at least approximately hollow-cylindrical form,
the base body has a constant material thickness at least approximately throughout,
the base body is made from a metal sheet, and
the base body includes said one or more elastically yielding spring elements, which are formed by one or more wall portions of the base body that project into the receiving space in a spiral shape in an installed condition of the anchor element.

3. The anchor element according to claim 1,
wherein said one or more elastically yielding spring elements are formed such that they taper in the direction of an end projecting into the receiving space, and
said one or more elastically yielding spring elements form latching springs for latching the fastening element in the anchor element.

4. The anchor element according to claim 1, wherein
the base body includes an insertion opening for inserting the fastening element into the receiving space, and in that said one or more elastically yielding spring elements each have two lateral flanks, wherein a lateral flank of a respective elastically yielding spring element that faces the insertion opening forms a smaller angle with a direction of connection than a lateral flank of this elastically yielding spring element that is remote from the insertion opening,
the base body of the anchor element includes a sleeve that forms a wall of the anchor element, wherein, in an installed condition of the anchor element, the one or more elastically yielding spring elements of the base body project from the sleeve into the receiving space, and the base body of the anchor element is formed in one piece.

5. The anchor element according to claim 1, wherein the anchor element includes two or more spring elements that are arranged one behind the other in a direction of connection.

6. The anchor element according to claim 1, wherein the base body includes an insertion opening, through which a fastening element is insertable into the receiving space, and a fastening opening arranged opposite the insertion opening, wherein, in the region of the fastening opening, the base body includes an inwardly projecting portion or takes a tapering form.

7. A fastening device for fastening an article to a further article, including:
   one or more anchor elements according to claim 1;
   one or more fastening elements for inserting and fixing in the one or more anchor elements.

8. The fastening device according to claim 7, wherein one or more of the fastening elements each include one or more fastening portions by means of which the one or more fastening elements are fixable in one or more receiving spaces of one or more anchor elements, and
   one or more of the fastening elements each include one or more anchoring portions by means of which the one or more fastening elements are fixable on or in one or more articles, and
   one or more of the fastening elements each include one or more abutment portions by means of which the one or more fastening elements are positionable in a predetermined position on or in one or more articles, and
   one or more of the fastening elements include in each case one or more fastening portions, in each case one or more anchoring portions and in each case one or more connection portions, wherein in each case a connection portion is arranged between an anchoring portion and a fastening portion of a fastening element.

9. The fastening device according to claim 8, wherein, in relation to a longitudinal centre axis of the fastening element, the connection portion has a smaller extent in the radial direction than an adjacent anchoring portion and an adjacent fastening portion.

10. The fastening device according to claim 7, wherein one or more fastening elements have, at least in certain regions, an at least approximately T-shaped longitudinal section.

11. The fastening device according to claim 7, wherein an end of a fastening portion of a fastening element that faces an anchoring portion of the fastening element is formed to taper towards the anchoring portion.

12. An anchor element for fastening an article to a further article, the anchor element comprising:
   a base body that takes a hollow form, at least in certain regions, and surrounds a receiving space for receiving a fastening element, wherein
   the base body includes one or more elastically yielding spring elements that are formed by one or more wall portions of the base body, and these project into the receiving space in an installed condition of the anchor element, wherein
   the anchor element includes one or more locking elements for locking one or more spring elements in a pre-stressed condition, wherein one or more locking elements are formed by wall portions of the base body, and wherein
   one or more locking elements project into the receiving space and, when a fastening element is inserted into the receiving space, are actuable for the purpose of releasing one or more spring elements.

13. An anchor element for fastening an article to a further article, the anchor element comprising:
   a base body that takes a hollow form, at least in certain regions, and surrounds a receiving space for receiving a fastening element, wherein
   the base body includes one or more elastically yielding spring elements that are formed by one or more wall portions of the base body, and these project into the receiving space in an installed condition of the anchor element, and
   the anchor element includes one or more fluid receptacles for receiving a fluid, in particular for receiving adhesive.

14. A fastening device for fastening an article to a further article, including:
   a base body that takes a hollow form, at least in certain regions, and surrounds a receiving space for receiving a fastening element, wherein
   the base body includes one or more elastically yielding spring elements that are formed by one or more wall portions of the base body, and these project into the receiving space in an installed condition of an anchor element,
   the fastening element for inserting and fixing in the anchor element,
   wherein an end of a fastening portion of the fastening element that is remote from an anchoring portion of the fastening element is formed to taper in the direction away from the anchoring portion.

15. A fastening device for fastening an article to a further article, including:
   a base body that takes a hollow form, at least in certain regions, and surrounds a receiving space for receiving a fastening element, wherein
   the base body includes one or more elastically yielding spring elements that are formed by one or more wall portions of the base body, and these project into the receiving space in an installed condition of an anchor element,
   the fastening element for inserting and fixing in the anchor elements
   wherein an end of a fastening portion of the fastening element that is remote from an anchoring portion of the fastening element is provided with a tool receptacle.

16. A fastening device for fastening an article to a further article, including:
   a base body that takes a hollow form, at least in certain regions, and surrounds a receiving space for receiving a fastening element, wherein
   the base body includes one or more elastically yielding spring elements that are formed by one or more wall portions of the base body, and these project into the receiving space in an installed condition of an anchor element,
   the fastening element for inserting and fixing in the anchor element,
   wherein two mutually opposite ends of a fastening element are anchorable to a respective article by means of a respective anchor element.

* * * * *